United States Patent
Crouch et al.

(10) Patent No.: US 6,517,612 B1
(45) Date of Patent: Feb. 11, 2003

(54) CENTRIFUGAL FILTRATION DEVICE

(75) Inventors: Steven Crouch, Chapel Hill, NC (US); Steve Wright, Hillsorough, NC (US); Jeffrey Storm, Durham, NC (US); Wai S. Poon, Hockessin, DE (US); Stephen K. Stark, Wilmington, DE (US); Daniel W. Thorpe, Hockessin, DE (US); Glenn R. Voshell, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/004,526

(22) Filed: Oct. 29, 2001

(51) Int. Cl.⁷ .................. B01D 33/044; B01D 45/12
(52) U.S. Cl. ............... 95/277; 95/270; 95/282; 55/304; 55/400; 55/521; 55/528
(58) Field of Search .................. 95/277, 278, 282; 55/301, 304, 317, 400–409, 521, 528

(56) References Cited

U.S. PATENT DOCUMENTS

| | | | |
|---|---|---|---|
| 2,569,567 A | 10/1951 | Korn | 183/77 |
| 3,107,987 A * | 10/1963 | Duer | |
| 3,123,286 A * | 3/1964 | Abbott | |
| 3,241,676 A * | 3/1966 | Neuville et al. | |
| 3,785,123 A * | 1/1974 | Leith | 55/96 |
| 3,828,524 A * | 8/1974 | Booth et al. | 55/43 |
| 3,857,687 A * | 12/1974 | Hamilton et al. | 55/337 |
| 3,962,153 A | 6/1976 | Gore | 260/2.5 R |
| 4,025,679 A | 5/1977 | Denny | 428/91 |
| 4,096,227 A | 6/1978 | Gore | 264/210 R |
| 4,110,392 A | 8/1978 | Yamazaki | 264/127 |
| 4,212,654 A * | 7/1980 | Caraway et al. | 55/91 |
| 4,266,829 A * | 5/1981 | Divers | 299/64 |
| 4,832,709 A * | 5/1989 | Nagyszalanczy | 55/1 |
| 4,878,930 A | 11/1989 | Manniso et al. | 55/493 |
| 4,902,423 A | 2/1990 | Bacino | 210/500.36 |
| 4,923,419 A | 5/1990 | Lawless et al. | 55/409 |
| 4,948,397 A * | 8/1990 | Kumar | 55/96 |
| 4,985,296 A | 1/1991 | Mortimer, Jr. | 428/220 |
| 5,096,473 A * | 3/1992 | Sassa et al. | 55/97 |
| 5,539,072 A | 7/1996 | Wu | 526/304 |
| 5,713,972 A * | 2/1998 | Snyder, Sr. | 55/317 |
| 5,746,789 A | 5/1998 | Wright et al. | 55/306 |
| 5,788,727 A * | 8/1998 | Barthelmess | 55/406 |
| 5,814,405 A | 9/1998 | Branca et al. | 428/311.51 |
| 5,843,390 A | 12/1998 | Plinke et al. | 423/239.1 |
| 5,976,224 A * | 11/1999 | Durant et al. | 95/268 |
| 6,004,365 A * | 12/1999 | Fiacco | 55/400 |
| 6,032,804 A * | 3/2000 | Paulson | 209/148 |
| 6,099,609 A * | 8/2000 | Lira et al. | 55/400 |
| 6,277,176 B1 * | 8/2001 | Tang et al. | 95/270 |
| 6,280,491 B1 * | 8/2001 | Oke | 55/300 |
| 6,348,086 B1 * | 2/2002 | Harms et al. | 96/125 |
| 6,372,005 B1 * | 4/2002 | Fiacco | 55/400 |
| 6,451,093 B1 * | 9/2002 | Miles | 95/270 |

* cited by examiner

*Primary Examiner*—Robert H. Spitzer
(74) *Attorney, Agent, or Firm*—Carol A. Lewis White

(57) ABSTRACT

This invention is directed to a continuously cleanable, high performance filtration apparatus and a method for using the apparatus. The apparatus is a radial inflow centrifugal filtration device, which includes a filter element located within a chamber and rotatably coupled to a filtered fluid outlet in a bulkhead that abuts the chamber. The filter element is generally tubular, its side-walls encircling and, thus, defining an interior plenum. The filter element side-walls incorporate a filter media, preferably a laminated microporous membrane filter media. The filter element is rotatably coupled at the filtered fluid outlet by a seal which can maintain a seal as filter element rotates. Additionally, the device can include a boundary layer momentum transfer device made up of a plurality of stacked annular disks having central openings, each disk separated from adjacent disks by a desired gap. The central openings define a cavity in which the filter element is mounted.

64 Claims, 11 Drawing Sheets

US 6,517,612 B1

CENTRIFUGAL FILTRATION DEVICE

FIELD OF THE INVENTION

This invention relates to a method and apparatus for separating particulates from a fluid using a centrifugal filtration device. More specifically, this invention relates to a method and apparatus for removing liquid or solid particles from a fluid, which can be a liquid or a gas, using a continuously cleanable high efficiency rotating filtration device utilizing microporous filtration material.

BACKGROUND

The removal of particulates from a fluid stream has long been a practice in a variety of industrial fields. Systems for filtering particulates from fluid streams include barrier and non-barrier inertial filtration devices. Barrier filtration devices can include porous media in the forms of filter bags, filter tubes, filter cartridges, and filter panels, while non-barrier devices can include electrostatic precipitators and inertial filtration devices such as rotating disk separators, cyclones, and venturi scrubbers.

Non-barrier, inertial devices offer several advantages over barrier filtration devices by avoiding reliance on barrier layers to stop and trap particles in fluids as the fluids pass through the layers. In one type of non-barrier, inertial device, the cyclone separator, contaminated fluid, such as a dust laden gas or particle-laden liquid tangentially enters near the top of an inverted cylindrical chamber. The curved tapering walls of a lower conical section of the cyclone impose a vortex motion on the incoming fluid, and the denser particles in the fluid are displaced towards the cyclone walls under the influence of centrifugal forces. The particles follow a downward spiral towards the cyclone exit near the apex of the cone, while separated fluid is drawn off from a central location in the upper portion of the cyclone. Cyclones are generally suitable for removing particles from gases when the particles are over about 5 $\mu$m in diameter, and contain no filter elements that need periodic cleaning or replacement. Also, in multiple cyclone systems, 80% to 85% efficiency can be attained for removing particles of about 3 $\mu$m diameter and above.

Another non-barrier, inertial device is a rotating disk separator, such as described in U.S. Pat. No. 2,569,567. Further refinement of rotating disk separators is embodied in U.S. Pat. No. 5,746,789. This type of separator comprises a plurality of annular disks rotatably mounted in a housing and concentrically stacked so that their hollow centers define a central plenum. Spacers closely regulate the gaps between the disks. One end of the plenum is sealed off with a cap, and the other end is left open and serves as a filtered fluid exit. As the disks rotate, particle-laden fluid enters the housing through an inlet and flows through the gaps between the rotating disks towards the plenum. Disk rotation creates boundary layers by imparting a rotational velocity component to particle laden fluid layers adjacent the disks, as the particle-laden fluid flows inwards and towards the plenum. The boundary layer fluid also imparts rotational velocity to particles entrained therein, which thereby experience a centrifugal force. Under appropriate conditions, the centrifugal force experienced by some particles can be greater than the drag forces on the particles caused by the fluid flow into the plenum. These particles are outwardly ejected from the rotating disk device. The fluid, now free of the ejected particles flows into the plenum and out the plenum exit. Rotating disk separators contain no filter elements that need periodic cleaning or replacement. Although these centrifugal filters have demonstrated submicron particle removal capabilities on a small scale, in practice, with higher volumetric flow rates common in many industrial applications, it is typically more challenging to remove particles smaller than about 2 $\mu$m due to the higher rotational speeds and pressure drops required. Thus, particle filtration for fluids containing a high percentage of particles of less than about 2 $\mu$m diameter using non-barrier, inertial devices remains impractical.

High efficiency barrier type filtration devices suitable for removing particles of less than about 2 $\mu$m in diameter are known. In barrier layer devices, barrier layers comprise filtration media formed into filter elements through which the flow of particle-laden fluid is directed. Over time, filter element performance can deteriorate as filtered particles accumulate on the surface or through the depth of the filter element. The flow of fluids, whether liquid or gas, produces a pressure differential, or pressure drop, across the element. Preferably, the pressure differential is as small as possible for a given fluid flow rate in order to minimize the power required to filter the fluid. In many of these conventional techniques, filtration efficiency increases as filtered particulates accumulate on the filter element. However, as particles accumulate in or on the element, the pressure differential may increase, or the flow rate of fluid through the element may be reduced, or both. Therefore, after an amount of particulate material has accumulated or when limits of acceptable pressure differential or flow rate reduction have been reached, the filter element is either removed or cleaned.

Periodic element replacement and cleaning is generally needed to minimize filtration performance degradation in these systems. Filter element replacement and cleaning can be inconvenient and costly especially when considering the cost of shutting down industrial processes to allow this maintenance to be completed. In addition, the filter element can fail mechanically as a result of the stresses caused by cleaning the filter, thus resulting in loss of filtration performance.

Filter elements are typically constructed from filtration materials, or media such as, for example, felts and fabrics made from a variety of materials, including polyesters, polypropylenes, aramids, glasses and fluoropolymers. Selection of the type of material used is typically based on the fluid stream with which the filter element comes in contact, the operating conditions of the system and the type of particulate being filtered.

Polytetrafluoroethylene (PTFE) has demonstrated utility in many areas. As an industrial material, such as a filtration material, for example, PTFE has exhibited excellent utility in harsh chemical environments, which normally degrade many conventional metals and polymeric materials. A significant development in the area of particle filtration was achieved when expanded PTFE ("ePTFE") membrane filtration media were incorporated as surface laminates on conventional filter elements. One example is taught in U.S. Pat. No. 4,878,930, directed to a filter cartridge for removing particles of dust from a stream of moving gas or air. Preferred filter materials for the cartridge are felt or fabric composites containing a layer of porous expanded polytetrafluoroethylene membrane.

Use of the ePTFE membrane greatly enhanced the performance of filter elements because the particles collected on the surface of the ePTFE, rather than in the depth of the elements as was occurring in the absence of the ePTFE layer. Several significant advantages were observed with these filter elements. For example, the filtration efficiency of the elements was high immediately from the outset of the filtration process, and it was not necessary to build up a cake of particles to achieve high efficiency.

Despite the superior performance and high filtration efficiency of cleanable ePTFE filtration media, filter element cleaning remains a problem, and filtration systems must frequently be shut down to remove and maintain filters, although cleaning methods have been developed to minimize these maintenance shut downs. For example, pulse jet cleaning, where the flow of the filtered fluid is temporarily reversed to dislodge accumulated material from the filter element surface, has been used for in situ filter element cleaning without shutting down the filtration system. However, in certain equipment where reverse fluid flow cannot be tolerated, back pulse or pulsejet cleaning cannot be used to clean the filter element.

Other methods of filtering, such as using rotating or centrifugal filters, have associated problems. Known centrifugal filters that use high efficiency filter media frequently do not work satisfactorily in single-stage filtration systems because they can quickly foul. High efficiency filter media are designed to remove high percentages of the particles in a fluid stream, where the particles are less than a specified size. Therefore, these filters are typically made from materials containing very small pores which are easily clogged and which can develop large capillary forces, trapping liquids that wick into the pores. In order to achieve acceptable fluid permeabilities in addition to high filtration efficiencies, filter media used in high efficiency filters are typically thin and weak, and are unable to withstand the centrifugal forces required to keep the media clean. Moreover, when laminated to backing materials for reinforcement, permeability can be reduced to unacceptable levels. When used upstream or downstream of other filtration systems, the expense and increased pressure losses of these rotating filters can offset the filtration performance benefits that may accrue from their use.

In addition, up to now, ePTFE filtration media have been found unsuitable for some applications. Despite high efficiency in some applications, ePTFE filtration media have been thought to be unsuitable for filtering gases containing entrained PTFE-wetting fluids. PTFE is hydrophobic and thus repels water. However, certain liquids, particularly oily liquids, tend to wet ePTFE surfaces. In addition, extended use can alter the surface energy of PTFE, and initially non-wetting fluids can eventually wet PTFE surfaces. During filtration, these wetting liquids can wick into the small pores of ePTFE filtration media and remain there, held by strong capillary forces. These capillary forces are inversely related to pore size. Thus, smaller pore sizes result in the generation of larger capillary forces. As filtration continues, wetting liquids blind ePTFE pores, resulting in reduced filtration media permeability and increased pressure drop across the filter. Even with thorough cleaning, a blinded filter element may not recover its full filtration performance.

In most industrial applications, non-barrier, inertial filtration devices alone cannot fully resolve these aforementioned problems economically. As discussed above, removing particulates of less than about 2 $\mu$m diameter can be impractical using non-barrier, inertial devices that do not use porous filter media. In addition, barrier filtration devices containing microporous filtration media are susceptible to clogging and blinding. Thus, a need still exists for high efficiency continuously cleanable filtration devices.

SUMMARY OF THE INVENTION

The present invention is directed to a continuously cleanable, high performance filtration apparatus and a method for using the apparatus. The apparatus is a radial inflow centrifugal filtration device, which comprises a bulkhead abutting a chamber, the bulkhead having a filtered fluid outlet. The device further comprises a filter element located within the chamber and rotatably coupled at the filtered fluid outlet to the first bulkhead by a seal. The filter element of the present invention is generally tubular, its side-walls encircling and, thus, defining an interior plenum. The filter element side-walls incorporate filter media, most preferably laminated microporous membrane filter media.

Additionally, the radial inflow centrifugal filtration device can also include a counterflow boundary layer momentum transfer device. The boundary layer momentum transfer device of the present invention comprises a plurality of stacked annular disks having central openings, each disk separated from adjacent disks by a desired gap, wherein the central openings define a cavity in which the filter element is mounted.

The radial inflow centrifugal device can be used to filter fluid. A method of using the device includes flowing a particle-laden fluid from the chamber through the filter media in the filter element and out through the filtered fluid outlet. As the fluid flows through the device, the filter element is rotated at sufficient speed to eject particles from the filter media. The method also includes collecting particles from the particle-laden fluid on the filter media.

DETAILED DESCRIPTION OF THE INVENTION

The present invention is directed to a continuously cleanable, high efficiency centrifugal filtration device for removing solid and liquid particles from particle-laden fluids. The particle-laden fluids can be, for example, particle-laden gases, including aerosols such as smokes, mists, dusts, fumes, fogs, and clouds.

Figure 1:
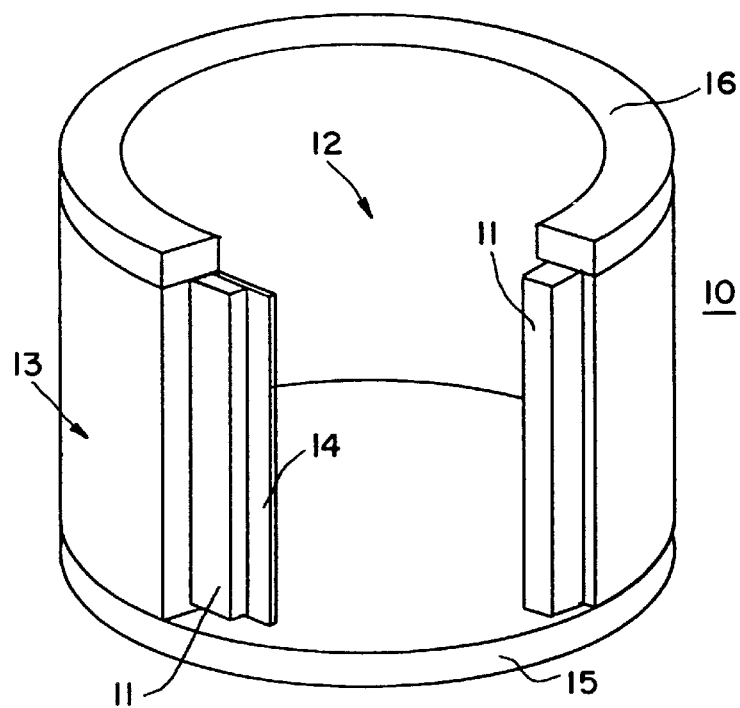
FIG. 1 is a perspective view of an embodiment of a filter element according to the present invention.

FIG. 1 illustrates an embodiment of a filtration device filter element 10, which can be rotatably mounted on a bulkhead. Filter media 11, made from a microporous polymeric filtration material is incorporated into the filter element side-walls, thus forming a barrier layer through which gas being filtered can permeate. The barrier layer functions to prevent particles in filtered particle-laden gas from passing through the filter media 11 and thus separates and accumulates filtered particles. The filter element 10 can be any desired tubular shape, provided that its side-walls encircle and define an interior plenum 12 through which filtered gas can flow after passing through the filter media 11. For example, suitable tubular filter element shapes can include, but are not limited to, a cylinder, a tapered cylinder, and a tube having a polygonal cross-section. Suitable shapes for the filter media 11 can include, for example, a cylinder, a pleated cylinder, a tapered cylinder, and a tube having a polygonal cross-section. Thus, in the present invention, the filter element 10 is a generally tubular assembly comprising at least filter media 11 plus any ancillary components that may be needed to direct the flow of particle-laden gas through the filter media 11, while allowing the rotation, and thereby the continuous cleaning, of filter media 11.

Accordingly, in addition to the filter media 11, the filter element walls can also include outer reinforcement element 13 and inner reinforcement element 14. The outer reinforcement element 13 and inner reinforcement element 14 can be support tubes, and support structures such as, for example, metal or plastic cages, which support and protect the filter media 11. These reinforcement elements 13, 14 permit the filter media 11 to maintain mechanical integrity and filtration performance when the filter element 10 rotates at required speeds. The filtration material that forms the barrier layer in the filter media 11 can be a polymer such as, for example, polypropylene, polyester, including conductive polyester, polyaramid, fiberglass, polytetrafluoroethylene or polyethylene, in the form of a non-woven, microporous sheet or membrane. Depending on the desired filtration and economics of the system, suitable filtration materials can be selected based on temperature requirements, material to be filtered, etc. For example, if a polyethylene filter media is incorporated, it may be in the form of a spunbond polyethylene, a bi-component spunbond polyethylene, a polyethylene felt, or combinations thereof, More preferably, the filtration material is a fluoropolymer, and even more preferably a perfluorinated polymer in the form of a non-woven, microporous sheet or membrane such as a microporous ePTFE membrane. A closed end cap 15 can be fitted at an end of the element 10 to seal off the plenum 12 and to prevent particle-laden gas outside the element 10 from entering the plenum 12 without passing through the filter media 11. Alternatively, an open end cap 16 can be fitted at one or more ends of the element 10, and provides an opening through which filtered gas in the plenum 12 can exit. The junction between the end caps 15, 16 on the filter element provides a seal preventing particle-laden gas from entering the plenum 12 without passing through the filter media 11.

Figure 2:
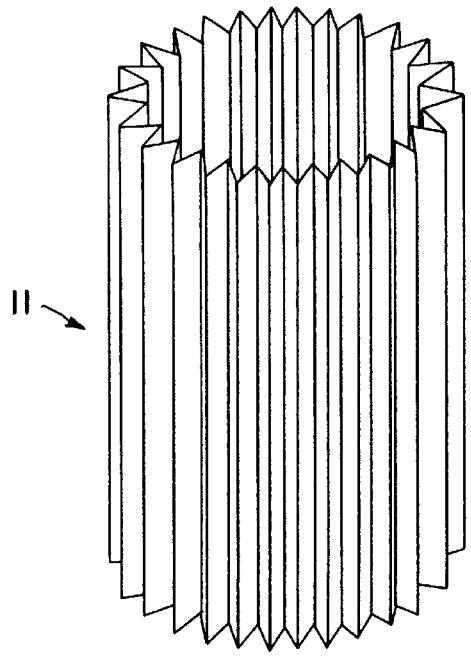
FIG. 2 is a perspective view of a pleated filter media that can be used in a filter element of the present invention.

In the present invention, microporous membranes are continuous sheets of material that are about 50% porous or more, i.e., have a pore volume of about 50% or more, with 50% or more of the pores having nominal diameters of about 5 $\mu$m or less. Microporous ePTFE membranes in the filter element preferably act as surface filters that trap and accumulate filtered particles on the upstream facing major planar surface of the membrane. The membranes can form the barrier layer in a filter element of any suitable shape as described above, for example, a pleated filter element 11, shown in FIG. 2. Microporous ePTFE membranes used in the filter element 11 can be prepared in accordance with one or more of U.S. Pat. Nos. 4,110,392; 4,096,227; 3,962,153; 4,025,679; 4,902,423; and 5,814,405. Membranes made according to the cited patents can have thicknesses ranging from, but not limited to, about 0.01 mm to about 2 mm, and exhibit desired combinations of filtration performance and mechanical strength. To achieve desired filtration performance and mechanical strength levels, membranes of the present invention have a porosity of more than about 70%, preferably above 80%, and even more preferably above 90%. Membrane porosity is the void volume percentage, or pore volume percentage, i.e., the void volume as a percentage of the combined pore volume and matrix volume of the membrane.

Also, membranes should exhibit high permeability to fluids and, in particular, to gases. Membrane air permeability can be determined according to a Frazier Number test method. In this method, air permeability is measured by clamping a test sample in a gasketed-flanged fixture, which provides a circular test area of approximately 6 square inches (2.75 inches diameter) for air flow measurement. The upstream side of the sample fixture is connected to a flow meter in line with a source of dry compressed air. The downstream side of the sample fixture is open to the atmosphere. Testing is accomplished by applying an air pressure of 0.5 inches of water to the upstream side of the sample and recording the flow rate of the air passing through the in-line flowmeter (a ball-float rotameter). The sample is conditioned at 70° F. and 65% relative humidity for at least 4 hours prior to testing. Results are reported in terms of Frazier Number which has units of cubic feet/minute/square foot of sample at 0.5 inches of water pressure.

Prior to lamination to any backing materials, membrane permeabilities can exceed 100 Frazier (F). Preferably, the membrane permeability should exceed about 1 F, more preferably exceed about 10 F, and even more preferably exceed 30 F. If the membrane is laminated to backing materials to form a composite material, the composite should have an initial permeability of more than about 1 F, preferably more than about 2 F, and even more preferably more than about 3 F.

In addition, the membrane should be strong enough to withstand centrifugal forces experienced during filtration. Membrane strength can be determined using a ball burst strength test. This test method and the related sample mounting apparatus were developed by W. L. Gore & Associates, Inc. for use with a Chatillon Test Stand. The test is a mechanical measurement of the burst strength of materials such as fabrics (woven, knit, nonwoven, etc.), porous or nonporous plastic films, membranes, sheets, etc., laminates thereof, and other materials in planar form.

A specimen is mounted taut, but unstretched, between two annular clamping plates (inside unsupported diameter –3 inches). A metal rod having a polished steel 1 inch diameter ball-shaped tip applies a load against the center of the specimen in the Z-direction (normal to the X-Y planar directions). The rod is connected at its other end to an appropriate Chatillon force gauge mounted in a Chatillon Materials Test Stand, Model No. TCD-200 (Ametek Test & Calibration Instruments, Largo, Fla.). The load is applied at the rate of 10 inches per minute until failure of the specimen occurs. The failure (tearing, burst, etc.) may occur anywhere within the clamped area.

Testing is done at ambient interior temperature and humidity conditions, generally at a temperature of 70–72° F. and relative humidity of 45–55%. Materials to be tested are not conditioned at specific temperature and humidity conditions prior to testing. Measurements are reported in pounds/inch$^2$ (psi). Membrane ball burst strengths between about 3 psi and about 50 psi are achievable. However, ball burst strengths should advantageously be more than about 1 psi, and preferably more than about 2 psi.

The ePTFE membrane may be filled with various fillers presently used to fill expanded microporous PTFE, as is taught in U.S. Pat. Nos. 4,096,227 and 4,985,296. Suitable particulate fillers may include, for example, inorganic materials such as metals, semi-metals, metal oxides, glass, ceramics, and the like. Alternatively, other suitable particulate fillers may include, for example, organic materials selected from activated carbon, carbon black, polymeric resin, and the like. Fillers can be selected to provide various additional filter element properties and functions. If conductive filler is used to fill the ePTFE membranes and is present in a sufficient amount, the ePTFE may exhibit static dissipative or conductive properties, and ePTFE filter elements produced from such ePTFE membranes may be static dissipative or conductive in nature as well. Fillers can be selected to provide catalytic activity. As disclosed in U.S. Pat. No. 5,843,390, catalytic filter material can be used for removing contaminants such as $NO_x$ from a gas stream. These fillers can also be incorporated into the backing layer that can comprise composite fibers of ePTFE filled with catalytic particles. The composite fibers can be chopped into staple fibers and made into a felt backing material. The combined filter and backing can be used to both remove macro-particles, such as dust, from the filter stream before the dust can clog active catalytic sites and effectively catalytically convert undesirable contaminants in the gas stream to acceptable end products.

In addition, internal and external surfaces of the ePTFE membrane can be coated with materials to enhance the membrane's properties. For example, as taught in U.S. Pat. No. 5,539,072, enhanced oleophobic properties can be obtained by contacting the membrane with an aqueous dispersion of polymer particles of an organic polymer having pendent fluorinated alkyl groups and in which the particles are very small, being on the order of 0.01–0.1 micrometer. The small size promotes uniformity of coating when the laminate or components are coated with the dispersion and then heated to flow the particles together. The organic polymer can be a polymer selected from the class consisting of polymers derived from fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl acrylamides, and fluoroalkyl sulfonamide acrylates.

The membrane, which forms the barrier layer, can also be bonded or laminated to a non-woven or felt textile backing material layer to form a laminated filter media 11. When laminated to a backing material, the barrier layer is placed upstream of the backing material so that particle-laden fluid being filtered first passes through the barrier before passing through the backing layer. Woven and non-woven textile fabrics, mats, and felts of natural, synthetic organic, glass, or metal fibrous materials may be used as well as porous polymeric films, sheets, and foams as backing materials. The resulting laminate should be selected to have a pore size appropriate for the size of particles being filtered from the fluid stream, and a composition appropriate for the temperature, corrosiveness, and other conditions to be encountered in filtration. Preferred filter element laminates can be composites of porous ePTFE membrane with polyester, conductive polyester, polypropylene, polyethylene, polyaramid, fiberglass, or polytetrafluoroethylene felts and fabrics and combinations thereof. In this embodiment, the filter media may be attached to the support structure in any number of configurations, depending on the desired performance of the filter.

The ePTFE membrane barrier layer can be attached to the backing layer by a lamination process. The two layers can be laminated by applying heat and pressure by passage through a nip of a heated roller and an elastomer silicone roller. Ranges for lamination of the ePTFE filter layer to the support layer will depend on the support layer material used. In general, the lamination conditions are: a temperature between 100° C. to 450° C., and preferably a temperature between 180° C. to 350° C.; a pressure between 2 to 100 psi (14 to 689 kPa), and preferably a pressure between 15 to 50 psi (103 to 345 kPa), and a fabric rate between 2 to 150 fpm (ft per min.) (0.6 to 46 m/min) and preferably, a rate between 20 to 80 fpm (6 to 24 m/min).

The laminated microporous membrane media used in the present invention should be strong enough to withstand centrifugal forces experienced during filtration. The strength of these laminates can be measured by a Mullen Burst Strength Test in which burst strength is measured using a Model A Mullen Tester, (available from B F Perkins, Chicopee, Mass.). In this test, a 5 inch diameter sample of the material to be tested is clamped between two horizontal, flat circular plates in the Mullen Tester. Fluid is displaced from a chamber by a piston moving at a constant rate, forcing a molded rubber diaphragm to expand through the lower plate opening (1.25 inch diameter) and exert a constantly increasing pressure against the unsupported area of the sample. At the same time, a gauge connected to the cylinder indicates the pressure rise in the cylinder. The instant the sample bursts, the pressure drops, leaving the gauge pointer stationary and indicating the force that was required to burst the sample. The Mullen burst pressure is measured in pounds per square inches (psi). When laminated to a backing layer, suitable ePTFE membranes burst strengths can exceed 25 psi, and preferably exceed 100 psi, and even more preferably exceed 200 psi. Table 1, below, provides an exemplary list of ePTFE membranes that can be used in the present invention together with membrane properties. Table 2, below, provides an exemplary list of ePTFE laminates that can be used as filtration media in the present invention together with laminate properties. The Colbond backing material is available from Colbond Nonwovens (Arnhem, Netherlands); the Reemay backing material is available from Reemay, Inc. (Old Hickory, Tenn.); the Southern Felt backing material is available from the Southern Felt Company, Inc. (North Augusta, S.C.); and the Kolon backing material is available from Kolon Industries, Inc. (Kyunggi-do, Korea).

TABLE 1

| Membrane | Weight (g/m2) | Perm, F (F) | Thickness (microns) | Ball Burst (psi) | Pore Size (microns) |
|---|---|---|---|---|---|
| A | 2.2 | 100 | n/a | 1 | n/a |
| B | 2.7 | 40.5 | 12.7 | 1.1 | 5.6 |
| C | 4.5 | 40 | n/a | 2.8 | n/a |
| D | 9.1 | 26 | 50.8 | 3.6 | n/a |
| E | 12.5 | 20 | 76.2 | 4.5 | 4.7 |

0.03 to 0.5 microns ($\mu$m) in diameter. The tested laminates are challenged with the aerosol having a face velocity of 10.5 feet per minute (fpm) through the laminates. Condensation nucleus particle counters measure the particle concentrations upstream and downstream of the tested laminate to determine the particle collection efficiency. The efficiency is reported as the percentage of particles collected by the filter to the upstream challenge particles. The pressure drop is recorded in mm of water gage. The test is done at ambient room temperature (70° F.) and relative humidity conditions (40%).

If present, the outer reinforcement element 13 and inner reinforcement element 14 can be made of welded wire mesh or woven or non-woven screen of steel, stainless steel, galvanized steel, aluminum, or plastic. The closed end cap 15 and open end cap 16 can be formed of thin steel, galvanized steel, stainless steel, or aluminum sheet, molded plastic or other materials, and may be stamped, spun, turned, molded, or cast. Molded end caps 15, 16 may be constructed of hardened encapsulating or potting material formed or molded about the bottom of the reinforcement elements 13, 14, and filter media 11, to effect a bottom seal and closure to the element 10. For example, a pre-shaped mold can be filled with encapsulating or potting material of the proper consistency or softness, the assembled element components pressed into or embedded in the mold, the encapsulating material allowed to cure or harden sufficiently to be self-supporting, the outer mold removed, and then allowed to cure or harden completely. The potting material can be a urethane, epoxy, or silicone rubber or in a thermoplastic resin plastisol or other suitable thermoplastic resin, for example, a commercial 2-component polyurethane resin system, such as the PN#DRZ 27141 system available from Isocyanate Corporation. Also, the filter media 11 can be bonded to end caps 15, 16 and to reinforcement elements 13, 14 as needed using hot melt polyimides, RTV silicones, epoxies, polyurethanes, and the like.

Figure 3:
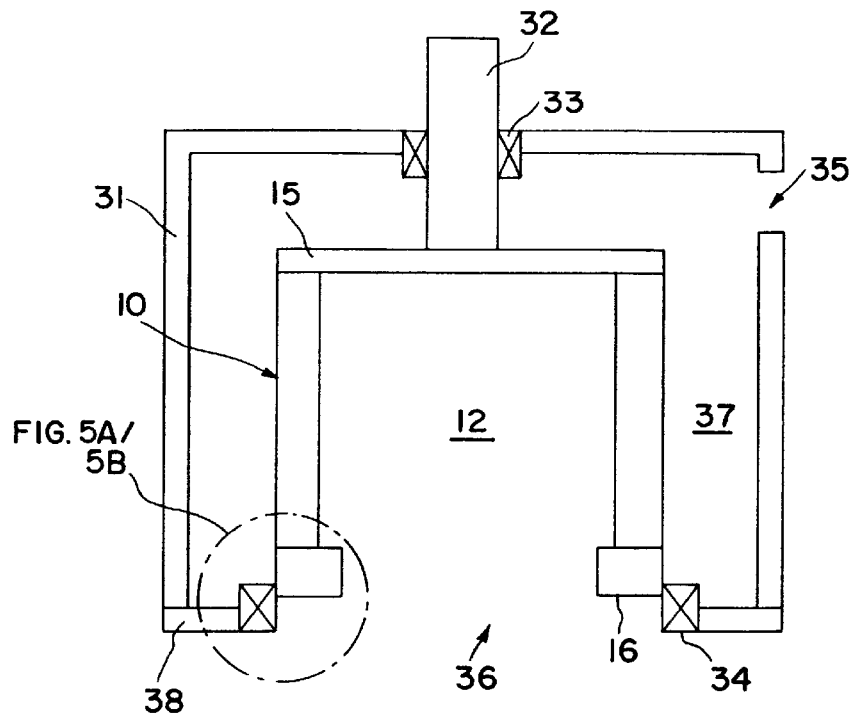
FIG. 3 is a side sectional view of a first embodiment of a centrifugal filtration device of the present invention.

In one embodiment, shown in FIG. 3, the filter element 10 can be rotatably mounted on a bulkhead 38 within a housing 31. The bulkhead 38 can be an external wall of the housing 31 abutting chamber 37. An inlet 35 inthe housing permits entry of particle-laden gas into the chamber 37 of the housing 31. Optionally, the housing 31 can be cylindrical and inlet 35 can be tangential, so that gas entering the housing 31 develops a rotational flow. Such rotational flow

TABLE 2

| Laminate | Membrane | Backing Material Description | Weight (oz/yd2) | Mullen Burst (psi) | Tensile Strength (lb) | Thickness (in) | Permeability (Frazier) | Efficiency @ 0.3 $\mu$m DOP |
|---|---|---|---|---|---|---|---|---|
| LXP1493 | A | Colback(2) - Bi-component spunbond | 7.4 | 340 | 100 | 0.039 | 45 | 70.9% |
| LXP1598 | B | Reemay(3) - PE spunbond | 4 | 107 | 100 | 0.022 | 17 | 93.4% |
| LXP2058 | C | Southen Felt(4) - PE felt | 12 | 300 | 135 | 0.055 | 15 | 90.4% |
| L4319 | B | Southen Felt(4) - PE felt | 12 | 300 | 135 | 0.055 | 8 | 95.6% |
| L4445 | D | Kolon(5) - PE spunbond | 8 | 250 | 77 | 0.023 | 6 | 98.3% |
| L4446 | E | Kolon(5) - PE spunbond | 7.4 | 250 | 160 | 0.031 | 5 | 99.2% |

As shown in Table 2, laminates suitable for the present invention can have high filtration efficiencies, i.e., the laminates are capable of removing 90% or more of particles 0.3 $\mu$m in size and larger from a particle-laden gas stream. The "Laminate Efficiency @ 0.3 $\mu$m DOP" column in table 2 lists laminate efficiencies measured by an automated efficiency tester (Model 8160, TSI, Inc., St Paul, Minn.). In the efficiency measurement, a dioctyl-phthalate (DOP) solution is atomized to generate an aerosol containing particles from promotes separation between the entering particle-laden fluid and entrained particulates in the chamber 37. The element 10 can be rotated by a drive shaft 32 connected to the closed end cap 15, although other rotational drive mechanisms for rotating the element 10 can also be used, such as coupling the element 10 to gear, belt, and chain drives. Preferably, the element is rotated about a rotational axis that passes through the plenum 12. A shaft bearing 33 rotatably couples the drive shaft 32 to the housing 31, while preventing particle-laden gas in the chamber 37 from leaking out of the housing. At the end of the element 10 that serves as a filtered fluid exit, the element 10 is mounted on seal 34, which maintains a seal between the open end cap 16 of the element 10 and the filtered fluid outlet 36 in the bulkhead 38 of housing 31, thereby preventing leakage between chamber 37 and the filtered fluid outlet 36.

Figure 5A:
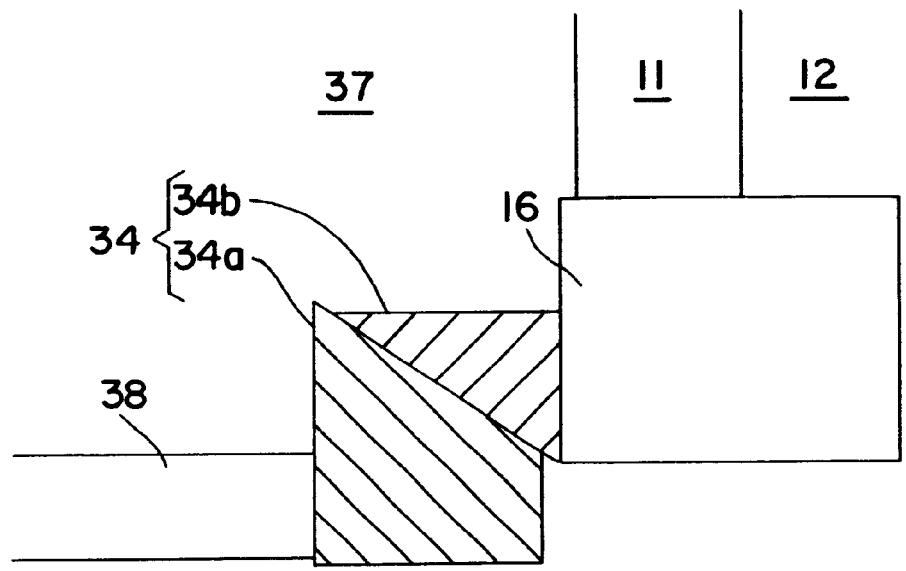
FIG. 5A is an enlarged view of a lip type contact seal according to the present invention.

Seal 34 can be any suitable contact or non-contact seal that rotatably couples the bulkhead 38 to the element 10, i.e., that permits the element 10 to continuously rotate, while minimizing flow of particle-laden gas from chamber 37 into the filtered fluid outlet 36 during filtration. FIGS. 5A–5F are perspective views of view A in FIG. 3, detailing various embodiments of the seal 34. For example, as shown in FIG. 5A, seal 34 can be a lip type contact seal, which includes a packing ring 34b made of a PTFE and barium sulfate composite material and a stationary ring 34a. A suitable packing ring material is available from Briggs Company (New Castle, Del.). The ring 34b is attached to, and rotates with, an outer edge of the open end cap 16, and contacts a polished stainless steel surface of a stainless steel stationary ring 34a, which is attached around the opening 36 of the bulkhead 38. The join between the stationary ring 34a and the packing ring 34b maintains a seal while permitting the filter element 10 to rotate with respect to the bulkhead.

Figure 5B:
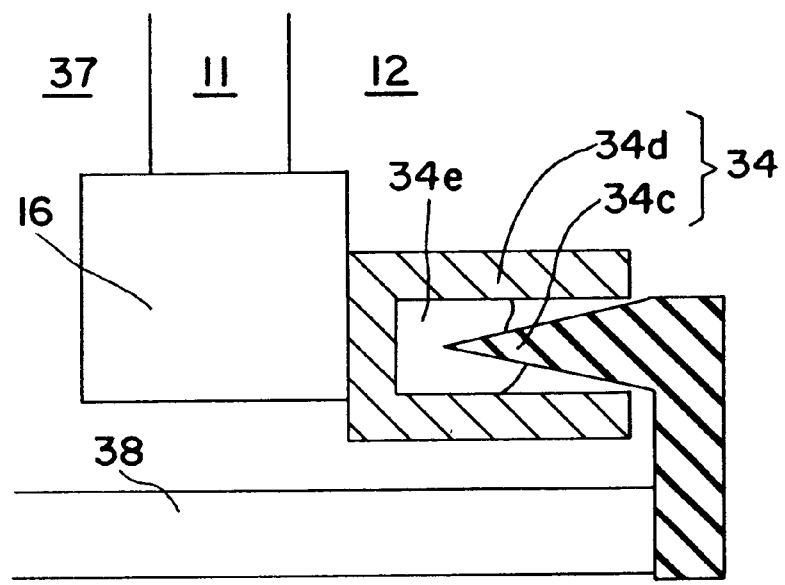
FIG. 5B is an enlarged view of a blade-in-channel type non-contact seal according to the present invention.
Figure 5C:
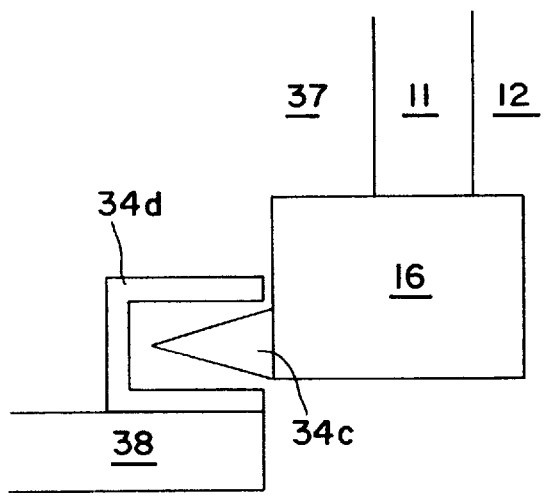
FIG. 5C is an enlarged view of an alternative embodiment of a blade-in-channel type non-contact seal according to the present invention.
Figure 5D:
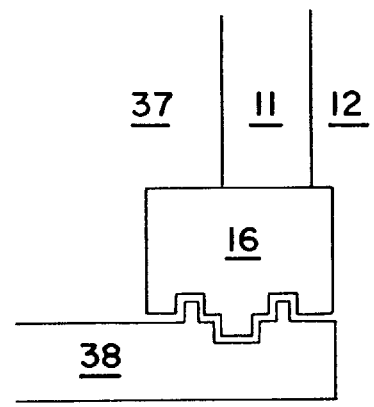
FIG. 5D is an enlarged view of a tortuous path type non-contact seal according to the present invention.
Figure 5E:
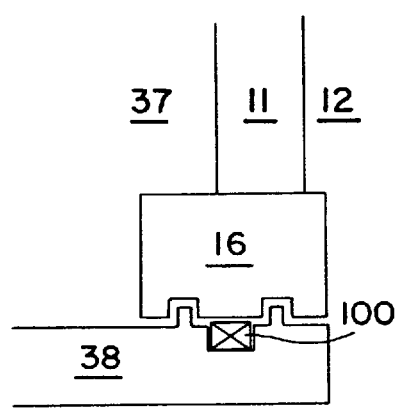
FIG. 5E is an enlarged view of an alternative embodiment of a tortuous path type non-contact seal of the present invention.
Figure 5F:
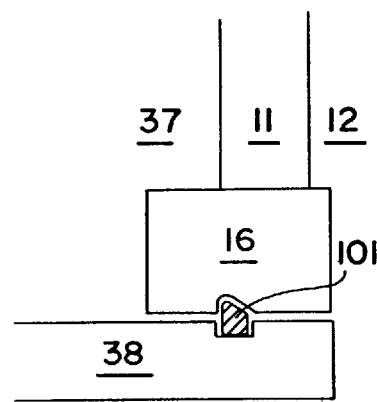
FIG. 5F is an enlarged view of yet another alternative embodiment of a tortuous path type non-contact seal of the present invention.

Alternatively, as shown in FIG. 5B, seal 34 can be a blade-in-channel type non-contact seal, in which a stationary blade 34c is attached and fixed to bulkhead 38 and a rotatable channel 34d is attached to and rotates with the open end cap 16 of the filter element 10. The channel 34d can be filled with a viscous lubricant 34e, such as a grease. As the channel 34d rotates during filtration, the grease is flung against the bottom wall of the channel 34d. However, there is sufficient lubricant 34e in the channel that the sharp edge of blade 34c remains embedded in, and cuts through, the grease 34e, maintaining a near gas tight barrier between the filter element 10 on one side of the seal, and the bulkhead 38 on the other. Alternatively, seal 34 can be a blade-in-channel type non-contact seal, shown in FIG. 5C, in which blade 34c is attached to the rotating filter element 16 and channel 34d is fixed to bulkhead 38. Another variation in non-contact seal design is that of a torturous path, shown in FIG. 5D, where the mating intersection of the rotating filter element 16 and the bulkhead 38 is not flat or planar, but where one or more series of concentric ridges and grooves are mirrored on both intersecting parts such that there is a tortuous fluid path that effectively minimizes any particle-laden fluid from bypassing this seal area. Another variation of the tortuous path seal, shown in FIG. 5E, is to have it contact the rotating filter element 16 using a felt seal 100 inserted/affixed into one or more of the grooves on the mating stationary bulkhead 38, further inhibiting particle-laden fluid bypass of this seal area. Yet another variation of the tortuous path seal, shown in FIG. 5F, is to have it contact the rotating filter element 16 using a molybdenum-impregnated PTFE "finger" seal 101 inserted/affixed into one of the grooves on the mating stationary bulkhead 38, where the "finger" tip of the seal just makes contact with the rotating filter element 16, thus inhibiting particle-laden fluid bypass of this seal area.

Figure 6A:
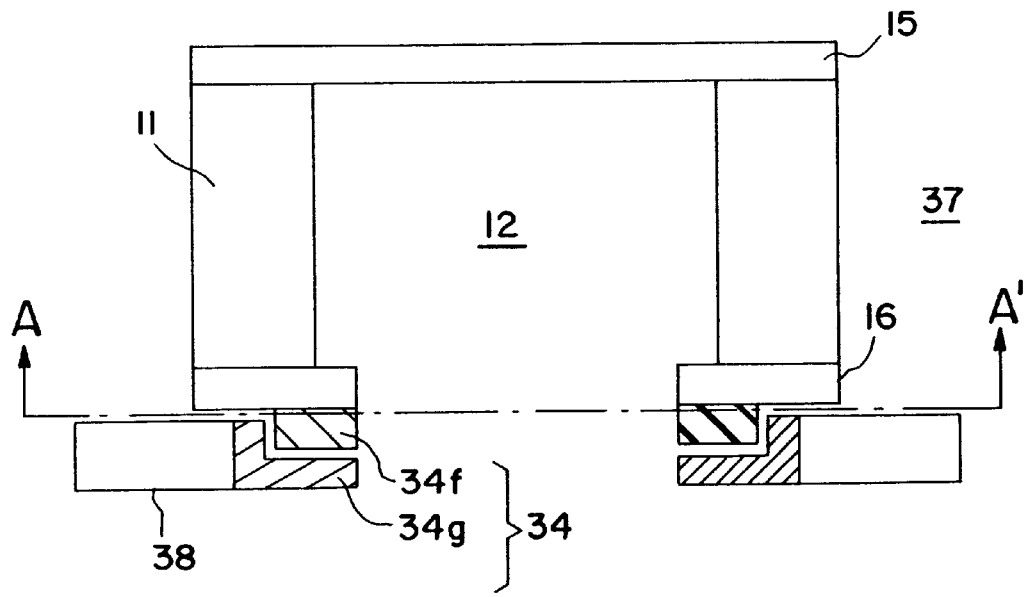
FIG. 6A is a side sectional view of an embodiment of a centrifugal filtration device incorporating a fan blade type of non-contact seal according to the present invention.
Figure 6B:
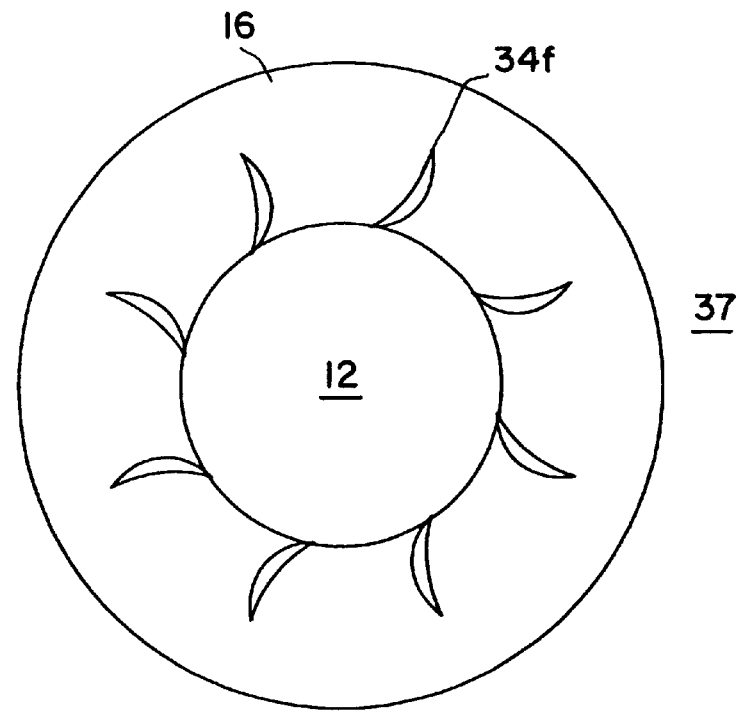
FIG. 6B is a bottom view of section AA' in FIG. 6A, showing the fan blades mounted on the centrifugal filtration device of the present invention.

A fan blade type seal 34 is an alternative non-contact seal 34, shown in FIGS. 6A and 6B. The seal 34 comprises a set of fan blades 34f attached to a surface of the filter element 10, such as a surface of the open end cap 16, adjacent the bulkhead 38. As shown in FIG. 6A the set of fan blades 34f can protrude into a mating recess 34g which is attached to the bulkhead 38. The set of fan blades 34f rotates with the filter element 10 and acts as a centrifugal fan to draw a clean gas flow from the plenum 12 and outlet 36 to the chamber 37 on the upstream side of the filter element 10. Thus, particle-laden gas is prevented from bypassing in the reverse direction, from the chamber 37 into the outlet 36.

During filtration, particle-laden fluid flows radially inwards from chamber 37 and through the filter media 11 under the influence of a pressure differential between the chamber 37 and the plenum 12 created by a suitable fluid pumping device such as, for example, a blower, a compressor, a fan, a turbine or a pump, which is connected in flow communication with the filtration device. Once filtered, the gas enters the plenum 12 and exits the filtration device via an opening in at least one of the ends of the element 10. As filtration continues, the filter element 10 is rotated about an axis that passes through the plenum 12, generating a centrifugal force. Particles in the particle-laden gas being filtered are trapped in the filter media 11 as the gas passes through. As the trapped particles begin to rotate with the filter media 11, they experience a centrifugal force and are ejected from the filter element. The ejected particles are subsequently collected from the chamber 37. Thus, the rotation continuously cleans the filter element by preventing filtered particles from embedding themselves within the depth of the filter media 11, preventing particle build up on the filter media 11. Depending on the materials filtered, rotational speeds can, for example, exceed 100 revolutions per minute ("RPM"), and can exceed 1000 RPM, and in some instances exceed 5000 RPM.

The centrifugal acceleration of the device in meters per second squared (m/s$^2$) can be calculated by r$\omega^2$, where r is the radius of rotation and $\omega$ is the rate of rotation in radians per second. Centrifugal accelerations can vary depending on the material being filtered. For example, in the case of liquids to be filtered, centrifugal accelerations of up to about 75 m/s$^2$, or higher, are suitable, and in the case of gases to be filtered, centrifugal accelerations in excess of 1000 m/s$^2$, or even in excess of 5000 m/s$^2$ are suitable.

Figure 4:
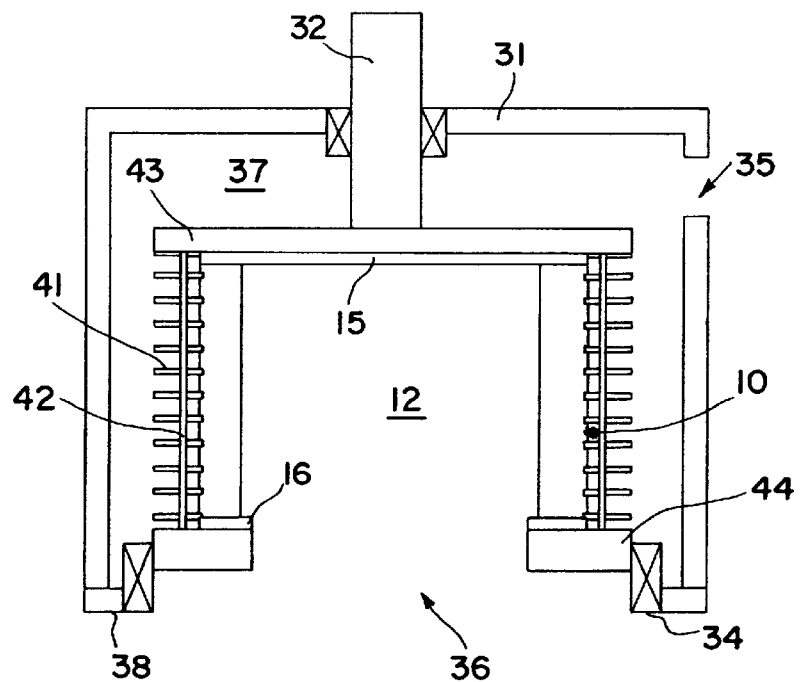
FIG. 4 is a side sectional view of a second embodiment of a centrifugal filtration device of the present invention, which includes a boundary layer momentum transfer device.

The centrifugal filtration device can also advantageously include a boundary layer momentum transfer ("BLMT") type radial inflow centrifugal filtration device as described, for example, in U.S. Pat. No. 5,746,789 and U.S. Pat. No. 4,923,491, which are herein incorporated by reference. The BLMT device comprises a plurality of annular discs, each having a central opening. The disks are stacked parallel to each other so that the central disk openings form a central cavity in which the filter element 10 is mounted, as shown in FIG. 4. The disks 41 can be mounted and spaced apart by long bolts 42 or by spacers. The bolts 42 extend into closed end plate 43 and open end plate 44 securing the disks and sealing the central cavity. Also secured between end plates 43 and 44 is the filter element 10 and sealing end cap 15, 16. The closed end cap 15 and open end cap 16 optionally can be incorporated into closed end plate 43 and open end plate 44 respectively.

In this embodiment, the BLMT device and the filter element 10 form a unitary assembly and rotate together. Any rotational speed is suitable, providing the filter element 10 remains sufficiently clean, i.e. the magnitude of gas flow rate reduction and pressure drop across the centrifugal filtration device does not exceed desired values, and providing excessive rotational speed does not result in mechanical failure. Rotational speeds can, for example, exceed 100 revolutions per minute ("RPM"), and can exceed 1000 RPM and, in some instances, exceed 5000 RPM. During filtration at these rotational speeds, gas pressure in the plenum 12 is lower than the pressure in the chamber 37, and gas flows between the disks and into the plenum 12. The rotation of the disks 41 establishes a boundary layer of air adjacent the major planar surfaces of the disks 41.

Depending on parameters, such as disk size, spacing between disks 41, rotational speed, disk surface roughness, pressure drop across the disks 41, the pressure, temperature, density and viscosity of the gas surrounding the disks 41, etc., either laminar or turbulent boundary layers of gas can be established on each side of each of the rotating disks 41. Gas in these boundary layers develop a velocity which has a rotational component in the direction of the rotating disks as well as a radial inward flow component towards the lower pressure in the plenum 12. Preferably, the selected rotational speed of the filtration device and its volumetric flow rate is sufficient such that the boundary layers between any two disks 41 overlap or at least touch. As particles in the particle-laden gas pass between the rotating disks 41, they are entrained in the rotating boundary layers, and angular momentum is transferred from the rotating disks via the boundary layers to these entrained particles. This is boundary layer momentum transfer. The transferred angular momentum causes some particles to be immediately expelled from the centrifugal filter device. The particles that are expelled are those that experience centrifugal forces generated by the particle's angular momentum that are greater than the drag forces on the particle produced by gas flow into the plenum 12. Conversely, particles not expelled by boundary layer momentum transfer are particles that experience large drag forces compared to centrifugal forces. These are generally, though not exclusively, smaller, lower mass particles.

A portion of the particles not expelled by BLMT reach the filter element surface and is caught by the filter media 11, where they may be accelerated to the rotational velocity of the filter element surface. Centrifugal forces experienced by these particles tend to prevent the particles from embedding themselves within the depth of the barrier layer of the filter media 11. Moreover, liquid particles that can wet the barrier layer filtration material are prevented from wicking into the filtration material micropores and blinding the filter media 11. As particles build up on the filter element surface, some may agglomerate or coalesce to form larger mass particles that develop sufficient centrifugal force to be expelled from the centrifugal filter device. Expelled particles from the media travel through the rotating disks of the BLMT to be collected in chamber 37. In addition, the use of a preferred membrane filter media, as described earlier herein, further enhances the cleaning efficiency of the filter system.

In the various embodiments of the present invention, the pressure differential between the chamber 37 and the plenum 12 can be maintained by a suitable fluid pumping device such as, for example, a blower, a compressor, a fan, a turbine or a pump, which is connected in flow communication with the filtration device. The pumping device can be remotely connected via appropriate ductwork, or can form an integral component of the filtration device. For example, the pumping device can be a fan located in the exiting filtered gas stream in or near filtered fluid outlet 36, and can be attached to the filtration device via a shaft connected to the element 10.

In one embodiment of the centrifugal filtration device, the BLMT device can be an InnovaTech NovaMist unit (InnovaTech, Durham, N.C.). The BLMT device is constructed of 180 annular, 0.02 inch thick aluminum disks 41, each having a 12 inch outer diameter and a 10 inch inner diameter. The disks 41 contain twelve holes equally spaced around each disk on a 10.5 in. diameter circle. The disks are stacked with twelve stainless steel rods 42 passing through the aligned holes, and with 0.5 mm thick spacers on each rod between each disk. The rods are attached to an open end plate 44 and a closed end plate 43. The bottom plate is removable to allow the installation and removal of the filter element 10.

The centrifugal filtration device of the present invention can be used in combination with other filtration devices. For example, filter systems can be added upstream or downstream of the device. Additionally, the device can be incorporated into other filtration devices. For example, the present centrifugal filtration device can be located at a fluid outlet within a cyclone vortex chamber where gas partially separated from entrained particulates exits the cyclone. Thus, the present centrifugal filtration device can be used to remove very small particles in the gas that were not removed by the cyclone.

One of the benefits of using laminated ePTFE membrane as a preferred filtration material in the present invention is the ease with which the material can be cleaned by applying a centrifugal force. Tests were conducted to determine and compare the effectiveness of cleaning ePTFE membranes with other filtration materials under centrifugal forces. In these tests, 25 mm diameter circular filter samples were first weighed, then loaded with SAE fine dust (available from Powder Technology Inc., Burnsville, Minn.) by filtering a dust laden air stream through the samples and allowing dust particles to accumulate on the sample until the pressure differential across the sample increased by 1000 Pa. After loading, the samples were again weighed, and the dust loading per unit area was calculated. Calculated dust loadings ranged from 35 g/m$^2$ to 110 g/m$^2$. The loaded samples were then mounted in a centrifuge with their loaded sides facing the bottoms of the loading cups, so that the centrifugal forces generated by rotational acceleration would tend to pull the dust off the samples. The samples were rotated at a set speed to produce a desired centrifugal acceleration for 5 minutes and then taken out and re-weighed again to determine the mass of dust released. The cleaning efficiency was calculated as the mass percentage of dust removed by centrifugation.

Two laminated GORE-TEX® membrane filters were tested against a non-laminated 16 oz/yd$^2$ polyester P84™ felt, available from Lantor Corporation (Bellingham, Pa.). The laminated GORE-TEX® membrane filters, part number L4427 available from W. L. Gore & Associates, Inc., consisted of an ePTFE membrane laminated to a 16 oz/yd$^2$ polyester felt backing, available from Southern Felt. The laminates had a 375 psi Mullen burst strength, a 150 lbs tensile strength, a 1.9 mm thickness, a Frazier number of 7, and a 93.31% efficiency 0.3 um DOP 10.5 fpm.

As expected, the cleaning efficiency increased with increasing centrifugal acceleration. Surprisingly, the laminated GORE-TEX® membrane filters achieved cleaning efficiencies of about 50% at about a 2200 m/s$^2$ centrifugal acceleration, and cleaning efficiencies of about 95% at about 4500 m/s$^2$ centrifugal acceleration. On the other hand, the non-laminated felt sample required a centrifugal acceleration of about 3200 m/s$^2$ to achieve a cleaning efficiency of about 50%, and a centrifugal acceleration of about 33000 m/s$^2$ to achieve a 90% cleaning efficiency.

Laminated ePTFE membranes used in the present invention are also capable of withstanding high centrifugal forces while maintaining mechanical integrity. Two filter media were tested for their ability to withstand high centrifugal force. The two media samples tested were a 1 um pore size non-laminated microfiberglass (Type A/E, available from Gelman Sciences, Ann Arbor, Mich.), and an ePTFE laminate (part number L4446, available from W. L. Gore & Associates, Inc., Elkton, Md.). The filter sample size was 25 mm diameter. Each sample was mounted in a model M000025A0 open-faced 25 mm Millipore filter holder (Millipore, Bedford, Mass.). Also, each sample was loaded with approximately 0.45 g of silicone oil using a liquid dropper. The oil completely wetted out the micro-fiberglass and ePTFE laminates. The mounted samples were placed in a laboratory centrifuge (Model GS-15, available from Beckman, Fullerton, Calif.) so that the open face of the holders faced the bottom of the centrifuge holding cups. The filters were located 126 mm from the center of rotation of the rotor. The samples were rotated for five minutes at 500 rpm, then taken out and inspected for any mechanical damage. The samples were put back and rotated at higher speed for 5 minutes and inspected again. This was repeated at rotational speeds of 1000 rpm, 1500 rpm, 2500 rpm, 3500 rpm, and 4500 rpm. Corresponding centrifugal accelerations were about 350 m/s$^2$, 1,410 m/s$^2$, 3,170 m/s$^2$, 8,810 m/s$^2$, 17,260 m/s$^2$, and 28,530 m/s$^2$, respectively. For the non-laminated micro-fiberglass media sample, cracks on the filter were observed after spinning at 1000 rpm. At 1500 rpm, the sample was broken into several pieces. In contrast, the ePTFE laminate sample had no mechanical damage, even at the highest speed of 4500 rpm.

Test Method 1

Figure 7:
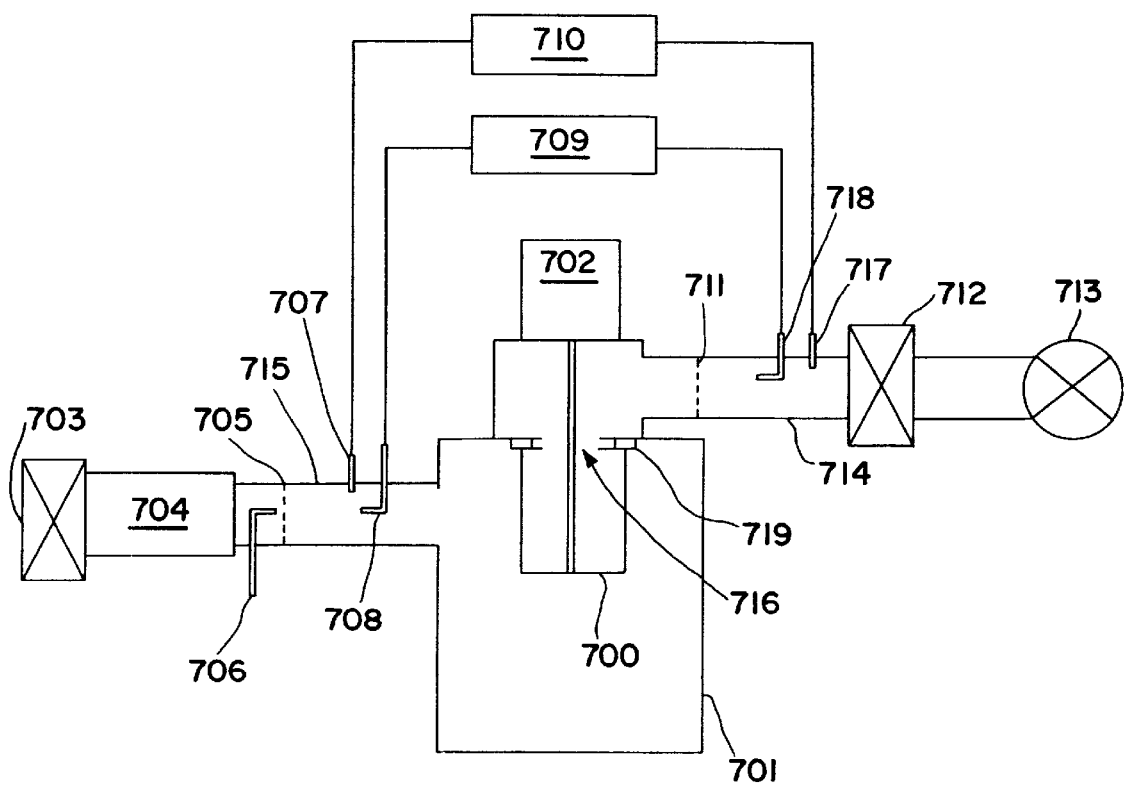
FIG. 7 is a diagram illustrating the apparatus used to test the centrifugal filtration device of the present invention.

FIG. 7 illustrates apparatus used to test the oil mist and oil smoke filtration performance of the centrifugal filtration device of the present invention. The filtration device 700 was mounted in a 55 gallon cylindrical drum housing 701, which had a 22.5 inch internal diameter and a 35 inch height, with its plenum opening facing the housing's filtered fluid outlet 716. The filtration device was driven by a 3 hp motor (Leeson C145T34FC1E, Grafton, Wis.) to which it was coupled via a shaft. The housing inlet was connected to a sheet metal inlet duct 715 which had a 6 in diameter and 5 ft length. An aerosol injector 706 located within the inlet duct 715 produced the test aerosol that was fed to the filtration device 700. An outlet duct 714, of similar dimensions as the inlet duct 715, was connected to the housing outlet 716. Perforated metal screens 705 were placed inside the inlet duct 4 ft from the housing inlet to obtain uniform airflow. An inlet pressure transducer 707, connected to pressure measurement instrumentation 710, and an inlet particle sampling probe 708, connected to particle measurement instrumentation 709 were located in the inlet duct 715 between the screen 705, and the housing inlet. A Merriam 50MH10-8 laminar flow meter 704 (obtainable from Merriam Cleveland, Ohio) was installed upstream of the inlet duct 715 and measures the air flow rate. A 20 inch by 20 inch HEPA filter 703, available from Applied Air Filters (Fremont, Calif.), was installed at the laminar flow meter inlet to protect the laminar flow meter 704 from particulates in the apparatus supply air, which was drawn from ambient air. Filtered exhaust air from the filtration device 700 exited via the outlet duct 714, which also contained a perforated metal screen 711, located 4 ft. from the housing outlet 716. An outlet pressure transducer 717, connected to pressure measurement instrumentation 710, and an outlet particle sampling probe 718, connected to particle measurement instrumentation 709 were located in the outlet duct 714 between the screen 711, and a 20 inch by 20 inch ASHRAE 95% air filter 712, available from Applied Air Filters (Fremont, Calif.), located at the end of the outlet duct 714. Airflow was provided by a blower 713 (Dayton 7C204, Niles, Ill.) connected downstream of the ASHRAE 95% air filter 712. Frequency inverters (Hitachi Model SJ100, Tarrytown, N.Y.) were used to control the blower speed and filter device rotation speed. The pressure drop of the filter device was measured by recording differences in pressure readings between the inlet pressure transducer 707 at 0.5 ft upstream and the outlet pressure transducer 717 at 4.5 ft downstream of the drum inlet and outlet 716, respectively, using Heise Model PM electronic pressure transducers (Heise, Newtown, Conn.).

Efficiency Measurement

For efficiency measurements, the aerosol injector 706 used was a TSI Model 3076 particle generator (TSI, St. Paul, Minn.), which atomized dioctyl-phathalate DOP) oil and injected the DOP into the inlet duct 715. The particle measurement instrumentation 709 was an aerodynamic particle sizer (TSI Model 3220, St. Paul, Minn.), which measured the particle size and concentration upstream and downstream of the filtration device. The inlet and outlet particle sampling probes 708, 718 were located at 1 ft and 4 ft upstream and downstream of the housing inlet and housing outlet 716, respectively. The collection efficiency was calculated from:

$$\text{Collection Efficiency, \%} = (1-(C_o-C_b)/C_i) \times 100$$

Where $C_o$=outlet particle concentration, #/cm$^3$ $C_i$=inlet particle concentration, #/cm$^3$ $C_b$=outlet background particle concentration, #/cm$^3$ Oil Mist Loading Characteristic Measurement The oil mist loading characteristic of the filtration device 700, i.e., the measured gas flow rate and pressure drop across the filtration device 700 when filtering oil mist, was measured by injecting an oil-based metal cutting fluid (Elf Lubricants, Elfcut 80, Rockingham, N.C.) into the inlet duct 715. The oil mist, which is a liquid-particle aerosol formed by condensation or atomization, containing particles of less than about 20$\mu$m in size, was produced using an aerosol injector 706, which was a Spraying Systems Company, Model 1/4J-SU11 spray nozzle (Spraying Systems Co. Wheaton, Ill.). A Cole-Parmer Instrument Model MasterFlex L/S 14 peristaltic pump (Cole-Parmer Instrument, Vernon Hills, Ill.) fed the oil from a reservoir to the aerosol injector 706. The airflow rate was held constant and the pressure drop across the filter device is monitored continuously.

Oil Smoke Loading Characteristic Measurement

The oil smoke loading characteristic of the filtration device was also tested. The smoke, i.e., a visible aerosol resulting from incomplete combustion containing particles less than about 1 $\mu$m, was produced by a particle generator (TSI Model 3076, St. Paul, Minn.) that atomizes an oil-based cutting fluid (Elf Lubricants, Elfcut 80, Rockingham, N.C.) to form an aerosol. The aerosol is heated to 150 degrees Celsius to vaporize the oil particles. The vapor is then condensed to form sub-micron smoke particles. The smoke was injected into the inlet duct 715 to load the filtration device. The airflow rate was held constant and the pressure drop across the filter device is measured continuously.

Test Method 2

Test method 2 was used to test the filtration device performance in filtering dust particles and aqueous mists. The apparatus used in this test was similar to the apparatus used in test 1, except that the laminar flow meter 704 and HEPA filter 703 were not connected to the inlet duct 715, no particle sample probes 708, 718 or particle measurement instrumentation 709 were installed, and a Lambda Square Inc., Model 4150-P orifice flow meter (Lambda Square Inc., Bay Shore, N.Y.) was connected between the ASHRAE 95% air filter 712 and the outlet duct 714, for airflow rate measurement.

EXAMPLE 1

Oil Mist Loading

A centrifugal filtration device, sample M, comprising a filter element constructed using a laminated ePTFE membrane filter media, part number L4445 (shown in table 2), was mounted into Test System 1. The filter media had 150 pleats. The pleat depth, i.e. the distance between adjacent pleat apices, was ⅝ inch and filter media height was 5¾ inch. The filter media filtration area was 7.5 ft². The filter media was loaded with oil mist having an airflow rate of 225 ft³/min, corresponding to air-to-cloth ratio of 30 ft/min. (The air-to-cloth ratio is the volumetric airflow rate through the filter media divided by the filter media filtration area.) The filtration device's rotation speed was 3450 rpm.

Figure 8:
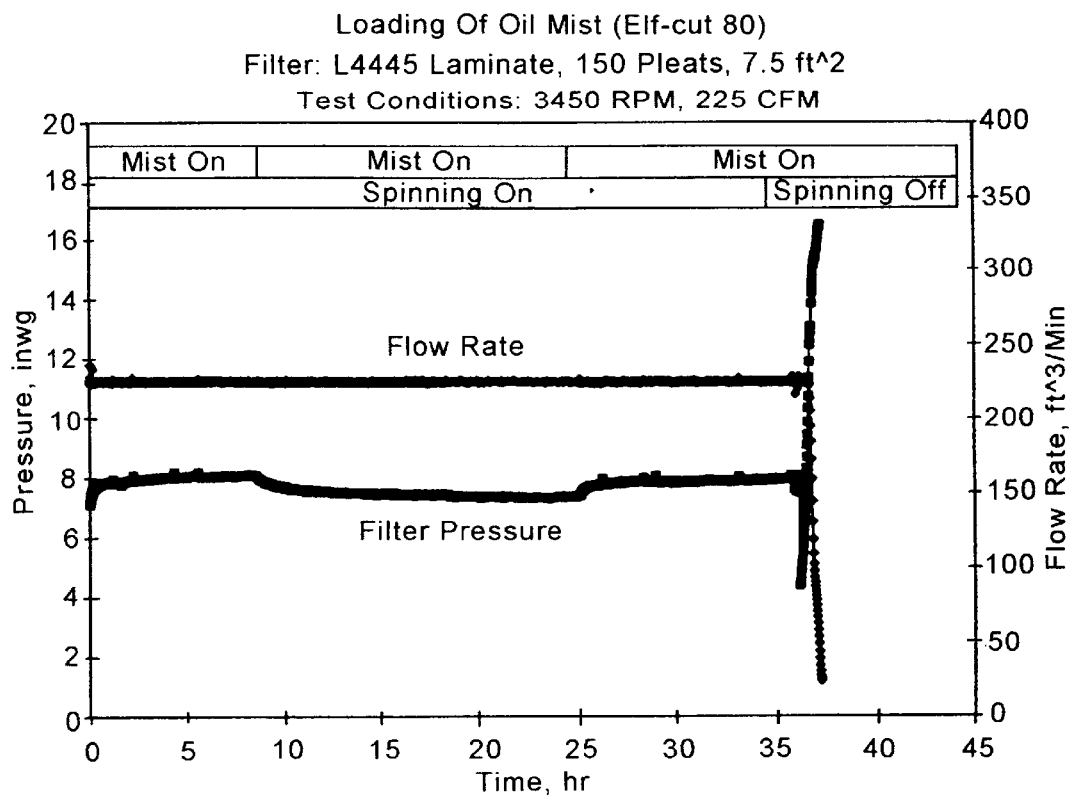
FIG. 8 is a plot showing the variation of pressure drop and flow rate with time across a centrifugal filtration device during an oil mist filtration test where the device is rotated at 3450 rpm.

As shown in FIG. 8, the initial pressure drop of the filter device was 7.1 inwg (inches of water gauge). After the filter device was challenged with oil mist at a concentration of approximately 90 mg/m³ for nine hours, the pressure drop stabilized at 8.1 inwg. In addition, the flow rate stayed constant. The oil mist was then stopped for 16 hours and it was found that the pressure drop stabilized at 7.3 inwg. The oil mist was turned on again for 11 hours and the pressure drop stabilized at 7.9 inwg. When filter rotation was stopped, the pressure drop initially decreased to 4.5 inwg but then rose rapidly to over 16 inwg in one hour. At the same time, airflow rate also dropped from 75 ft³/min to 24 ft³/min.

EXAMPLE 2

Oil Smoke Loading

Figure 9:
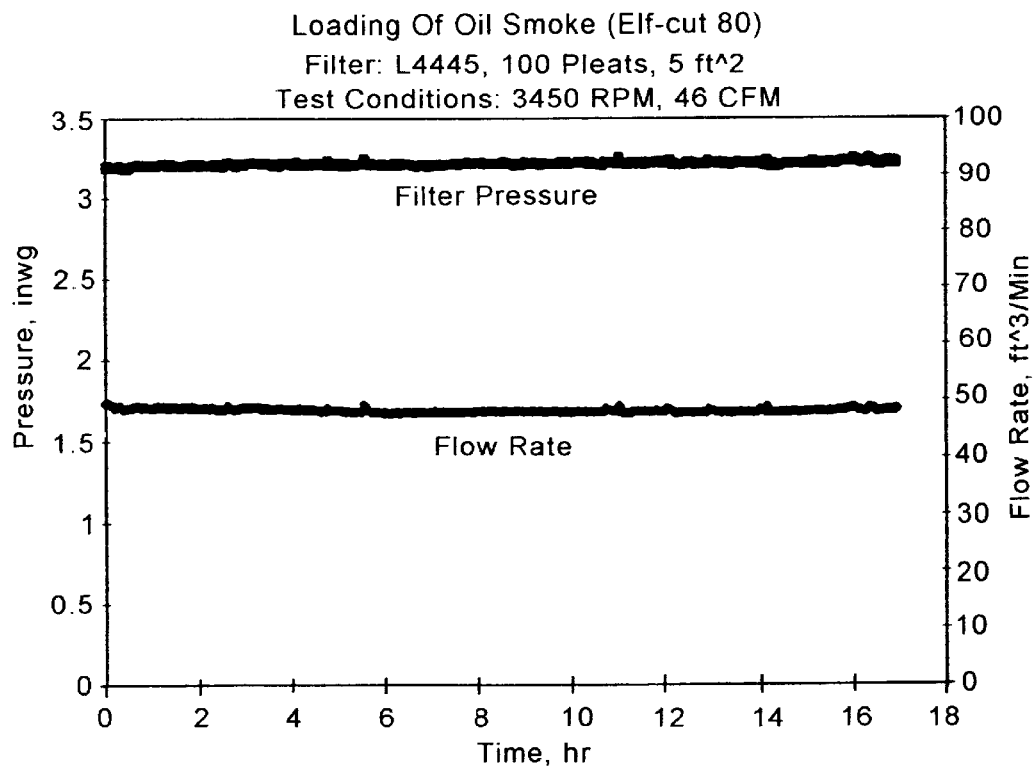
FIG. 9 is a plot showing the variation of pressure drop and flow rate with time across a centrifugal filtration device during an oil smoke filtration test where the device is rotated at 3450 rpm.

Sample N was a centrifugal filtration device comprising a filter element constructed using a laminated ePTFE membrane filter media, part number L4445 (see table 2). The filter media had 100 pleats, a ⅝ inch pleat depth, and a 5¾ inch pleat height. The total filter media filtration area was 5 ft². The filter element was loaded with oil smoke in Test System 1 as described previously. The airflow rate was 46 ft³/min, corresponding to air-to-cloth ratio of 9.2 ft/min. As shown in FIG. 9, pressure drop and air flow rate across the filtration device remained constant while the filter element was loaded for 17 hours and the filtration device rotated at 3450 rpm.

Figure 10:
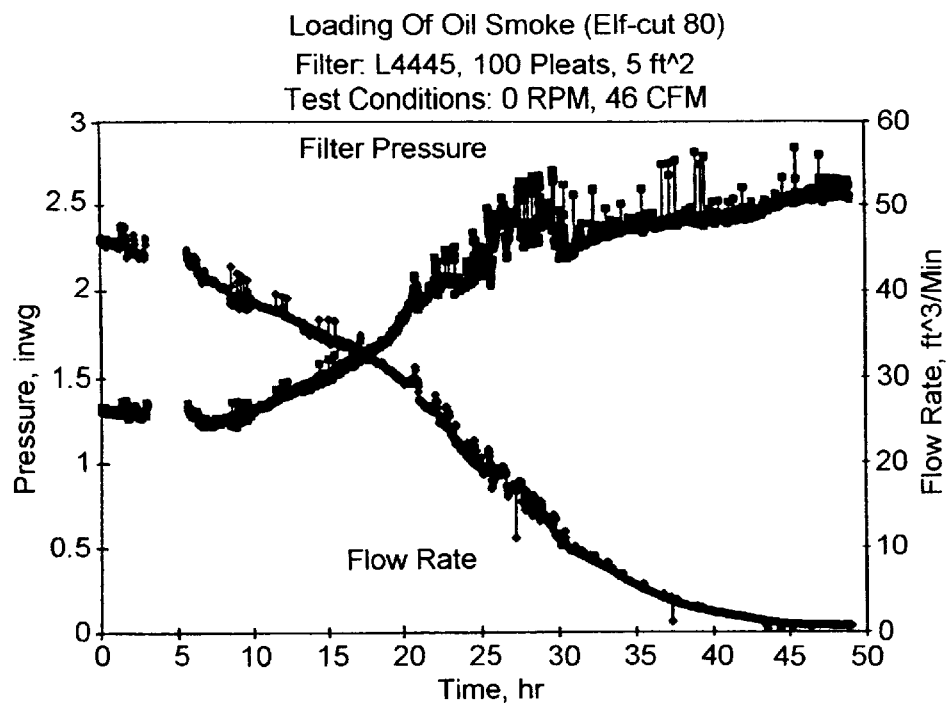
FIG. 10 is a plot showing the variation of pressure drop and flow rate with time across a centrifugal filtration device during an oil smoke filtration test where the device is rotated at 0 rpm.

Sample P was similar to sample N and was tested under similar conditions except that it was not rotated. The filtration device was challenged with oil smoke for 50 hours. As shown in FIG. 10, the pressure drop increased from 1.3 to 2.5 inwg and the airflow rate decreased from 46 to 1 ft³/min.

EXAMPLE 3

Aqueous Mist Loading

Figure 11:
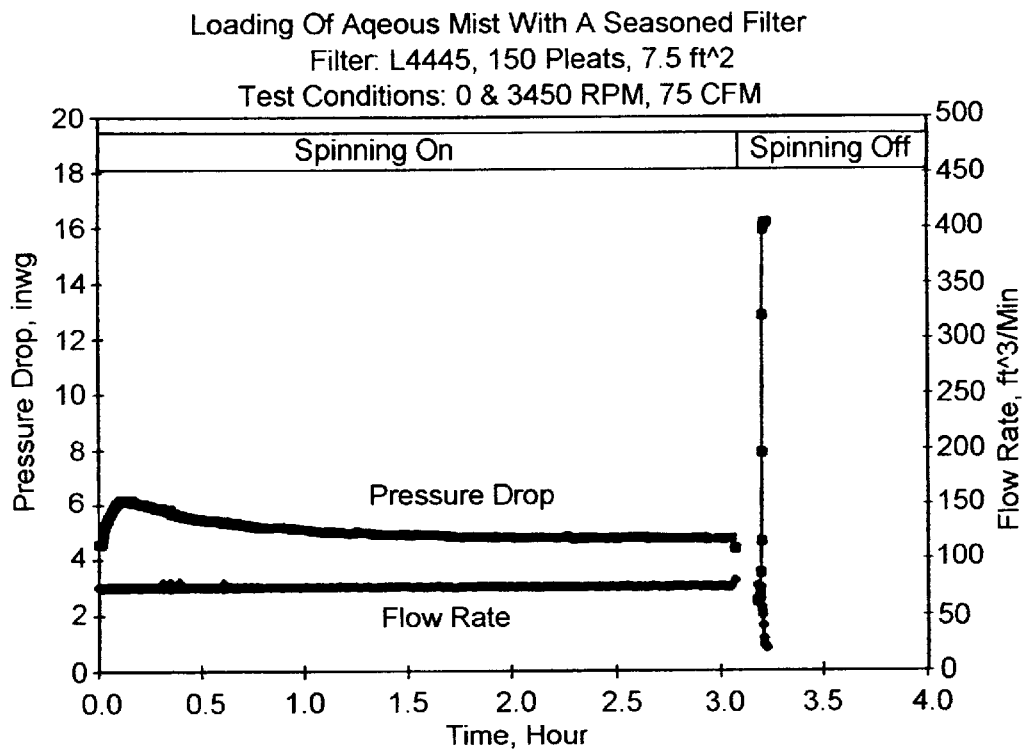
FIG. 11 is a plot showing the variation of pressure drop and flow rate with time across a centrifugal filtration device during an aqueous mist filtration test where the device is rotated at 3450 rpm and 0 rpm.

Sample Q was a centrifugal filtration device comprising a filter element constructed using a laminated ePTFE membrane filter media, sample L4445 (see table 2). The filter media had 150 pleats. The pleat depth was ⅝ inch and the filter media height was 5¾ inches. The total filter cloth area was 7.5 ft². The device was loaded with aqueous mist in Test System 2 as described previously. The airflow rate was 75 ft³/min, corresponding to air-to-cloth ratio of 10 ft/min. The filtration device's rotation speed was 3450 rpm. As shown in FIG. 11, the initial pressure drop was 4.5 inwg. After three hours, the pressure drop and air flow rate were stable. The rotation was then stopped. The pressure drop rapidly increased to 16 inwg in less than 2 minutes, and the airflow rate decreased to 20 ft³/min.

EXAMPLE 4

Aqueous Mist Loading

Figure 12:
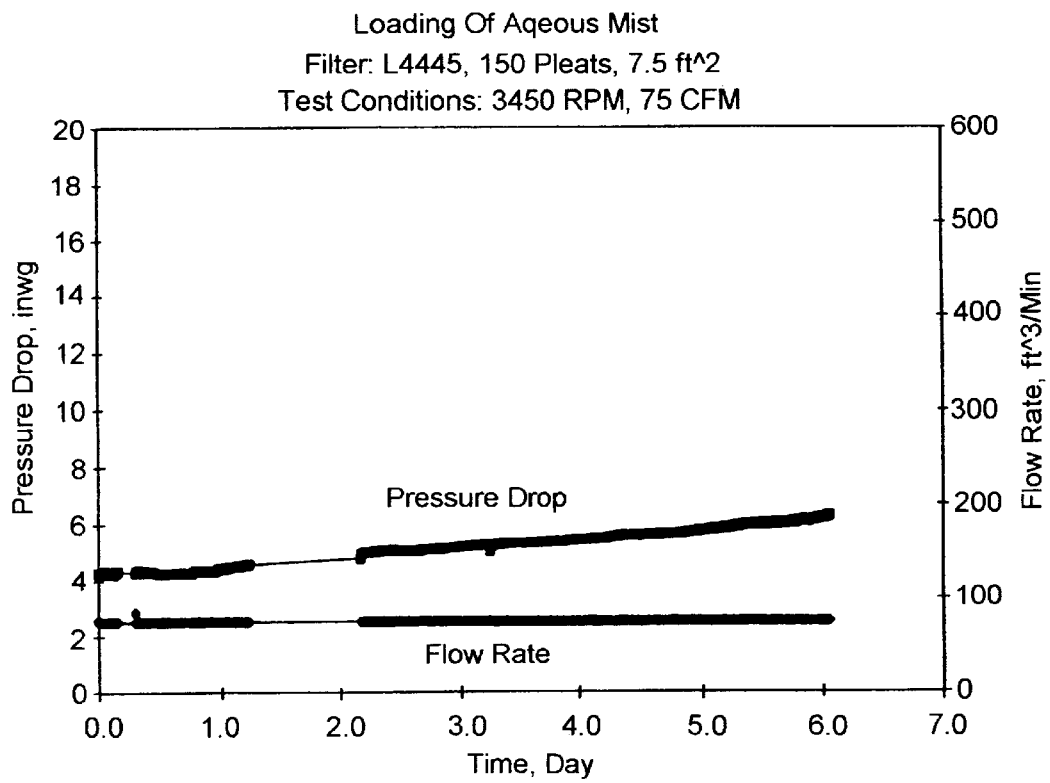
FIG. 12 is a plot showing the variation of pressure drop and flow rate with time across a centrifugal filtration device during an aqueous mist filtration test where the device is rotated at 3450 rpm.

Filter R was a centrifugal filtration device comprising a filter element constructed using a laminated ePTFE membrane filter media, part number L4445 (see table 2), having 150 pleats. Pleat depth was ⅝ inch and filter media height was 5¾ inch. The filter media filtration area was 7.5 ft². The filtration device was loaded with aqueous mist in Test System 2 as described previously using an air flow rate of 75 ft3/min, corresponding to air-to-cloth ratio of 10 ft/min. The filter rotation speed as 3450 rpm. The filter was loaded with one gallon per hour of aqueous mist for six days continuously. As shown in FIG. 12 the initial pressure drop across the device was 4.2 inwg, which increased to 6 inwg over time. The airflow remained constant at 75 ft³/min.

Figure 13:
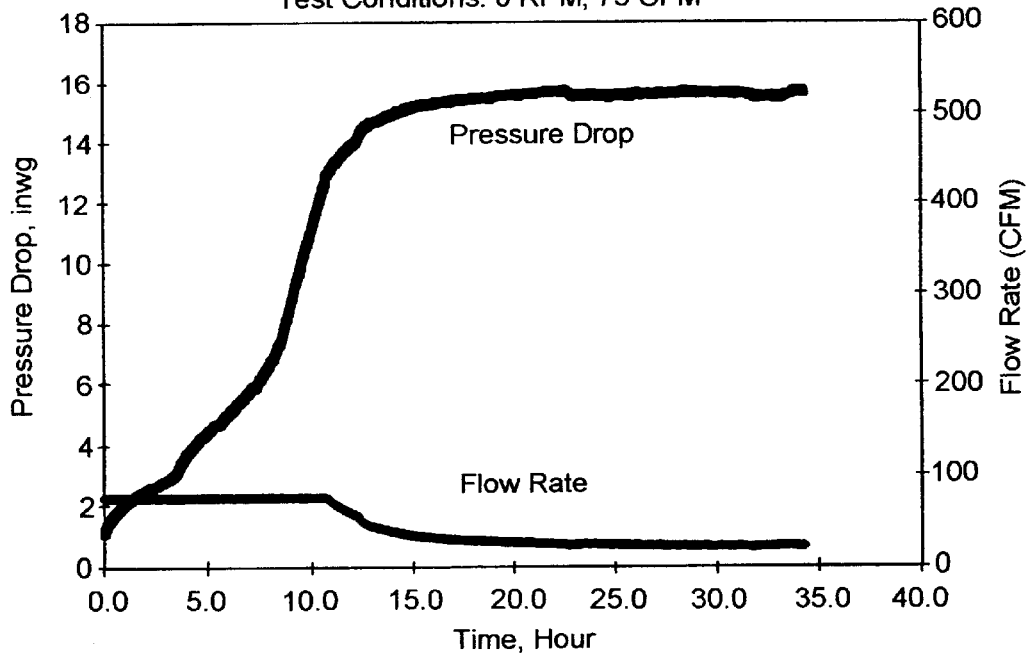
FIG. 13 is a plot showing the variation of pressure drop and flow rate with time across a centrifugal filtration device during an aqueous mist filtration test where the device is rotated at 0 rpm.

Filter S was similar to Filter R and was tested under similar conditions except that it was not rotated. As shown in FIG. 13, pressure drop rose from about 1.2 inwg initially to about 13 inwg in 11 hours, and eventually rose to 15.5 inwg over about 35 hours. At the same time, the flow rate also decreased to about 22 ft³/min.

EXAMPLE 5

Effect of Seals on Filter Collection Efficiency

The sealing efficiency of three different types of rotating seals was tested. The rotating seals were mounted between the open end cap of the filter element to prevent bypass of particle-laden air from the upstream side of the filter element 10 to the downstream side. Seal A was a contact seal having a PTFE and barium sulfate packing ring, seal B was a non-contact rotating gas seal, and seal C was a fan blade seal, all as described in more detail above.

Figure 14:
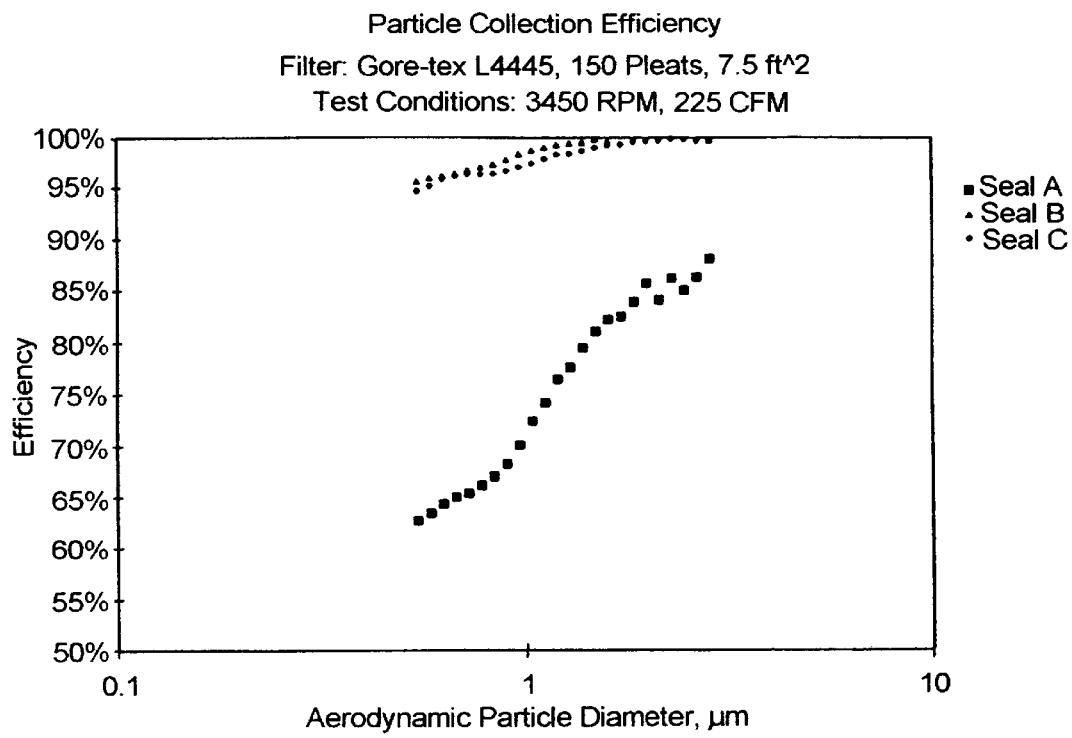
FIG. 14 is a plot showing the variation of particle collection efficiency with particle size in a centrifugal filtration device of the present invention using various types of rotating seal, where the device is rotated at 3450 rpm.

Filtration efficiency of filtration devices T, U, and V incorporating seals A, B, and C respectively, were measured using Test System 1. The filtration devices T, U, and V were similar, each incorporating the same laminated ePTFE filter media, part number L4445 (see table 2). The filter media had 150 pleats, with a ⅝ inch pleat depth and a 5¾ inch pleat height. The total filter cloth area was 7.5 ft². The filter element was rotated at 3450 rpm. The flow rate of particle-laden air was 225 ft³/min, corresponding to an air-to-cloth ratio of 30 ft/min. The collection efficiency of the seals is shown in FIG. 14.

EXAMPLE 6

Oil Mist Loading BLMT+Filter

Filter W was a centrifugal filtration device comprising a filter element constructed using an ePTFE filter media, part number L4445 (see table 2), having 150 pleats. The filter media pleat depth was ⅝ inch and filter element height was 5¾ inch. The filter element filtration area was 7.5 ft². The filter was mounted inside the central cavity of a BLMT type radial inflow centrifugal filtration device. The BLMT device was an InnovaTech NovaMist unit, obtained from InnovaTech (Durham, N.C.), and was constructed of 0.017 in thick aluminum disks each having a 12 in. outer diameter and a 10 in. inner diameter. The BLMT device included 180 disks, which ere mounted with a gap spacing of 1 mm. The combination filter device was loaded with oil mist using Test System 1. The airflow rate was 75 ft³/min, corresponding to air-to-cloth ratio of 30 ft/min. The device rotation speed was 3450 rpm.

Figure 15:
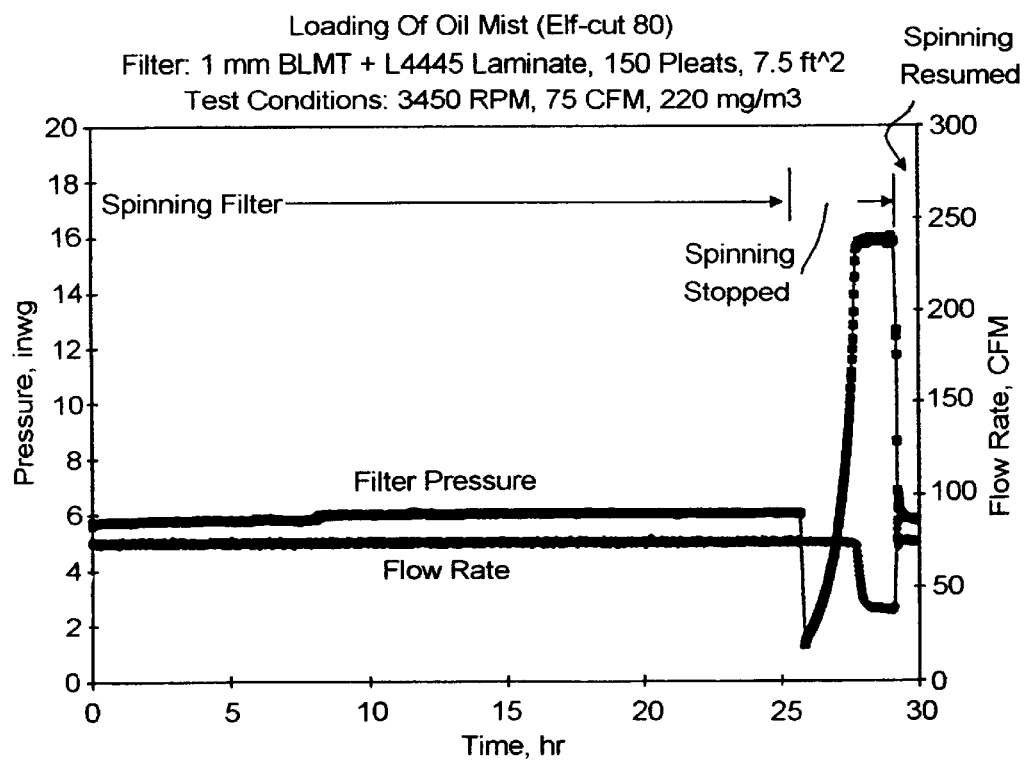
FIG. 15 is a plot showing the variation of pressure drop and flow rate with time across a centrifugal filtration device, which includes a boundary layer momentum transfer device, during an oil mist filtration test where the device is rotated at 3450 rpm.

As shown in FIG. 15, the initial pressure drop of the filter device was 5.7 inwg (inches of water gauge). The filtration device was challenged with oil mist at a concentration of approximately 220 mg/m³ for 26 hours. The pressure drop became stable at about 6.0 inwg and the flow rate remained constant. The filter was then stopped from rotating. The pressure drop initially decreased to 1.3 inwg, but rose rapidly to over 16 inwg in two hours. The airflow rate also dropped from 75 ft³/min to 37.5 ft³/min. After 2.5 hours, rotation of the filtration device resumed. The pressure drop decreased from 16 inwg to 5.7 inwg that was the same as original pressure drop.

Test Method 3

In a third test method, apparatus used was similar to the apparatus of Test Method 1. However, in this test method, the particle size and count was taken downstream of the unit with an instrument used to measure the removal efficiency of the centrifugal filtration device. The instrument was a Met-One Laser Particle counter (model#237). The Met-One is a class 1, laser based sensor particle counter, having a 5 channel output that measures cumulative and differential counts for 5 different ranges. The ranges are 0.5 μm, 0.7 μm, 1.0 μm, 2.0 μm, 3.0 μm and 5.0 μm. A one-second sample of the airflow was taken through the sample port in the outlet duct 714 from the unit; the sample rate was 0.1 cfm. Measurements were taken 4 times every 30 minutes. The counts were then averaged together to get the mass calculations for each run.

EXAMPLE 7

Figure 16:
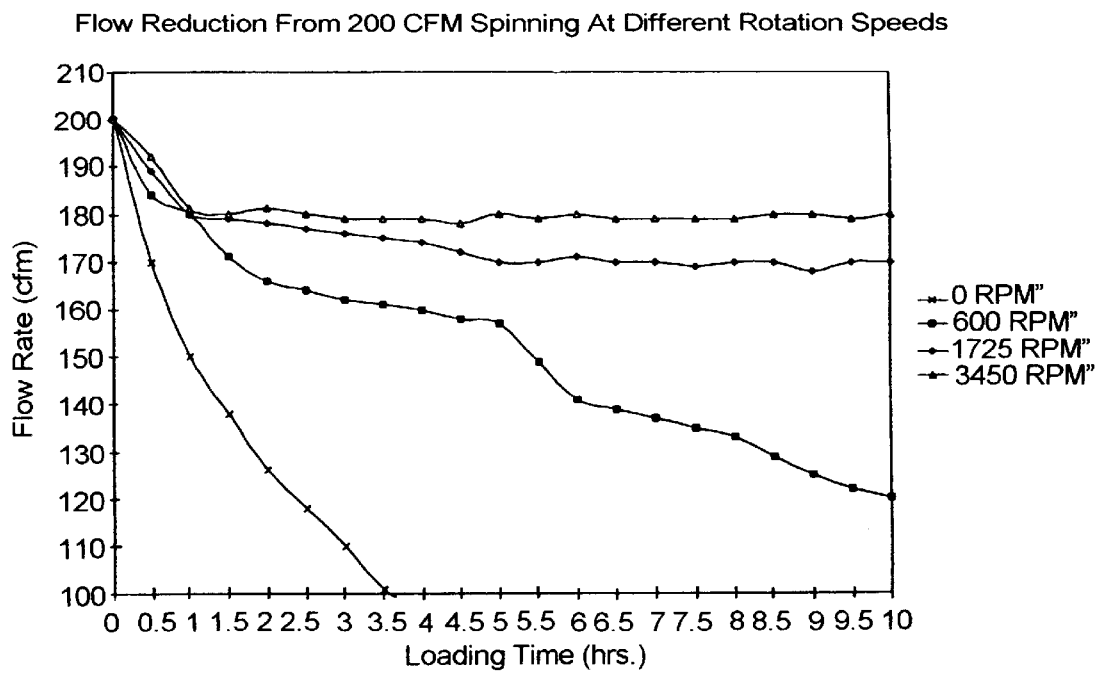
FIG. 16 is a plot showing the variation in flow rate with time, for a constant pressure drop and at various rotational speeds, across a centrifugal filtration device, which includes a boundary layer momentum transfer device, during an oil mist filtration test.

The filtration performance of a centrifugal filtration device was tested according to test method 3. The centrifugal filtration device, sample X, comprised a pleated, cylindrical filtration media, using the part number L4445 material. The filtration media was mounted in a similar BLMT device to that used in Filter W. As shown in FIG. 16, measurements were taken over the course of four runs and during each run, the filtration device was rotated at a different speed: 0 rpm, 600 rpm, 1725 rpm, and 3450 rpm. At the beginning of each run, the particle-laden airflow rate was set at 200 cfm, and as each run progressed, the pressure drop across the filtration device was held constant so that any accumulation of particulates on the filter media surface would result in a drop in air flow rate. The device was challenged with an oil mist and, as shown in FIG. 16, increasing the filtration device's rotational speed reduced the accumulation of particles on the filtration media surface. At rotational speeds of 1725 rpm and 3450 rpm, the filtration device achieves a substantially steady state flow at about 170 cfm and 180 cfm respectively, whereas at 0 rpm and 600 rpm the filtration media becomes blinded.

Figure 17:
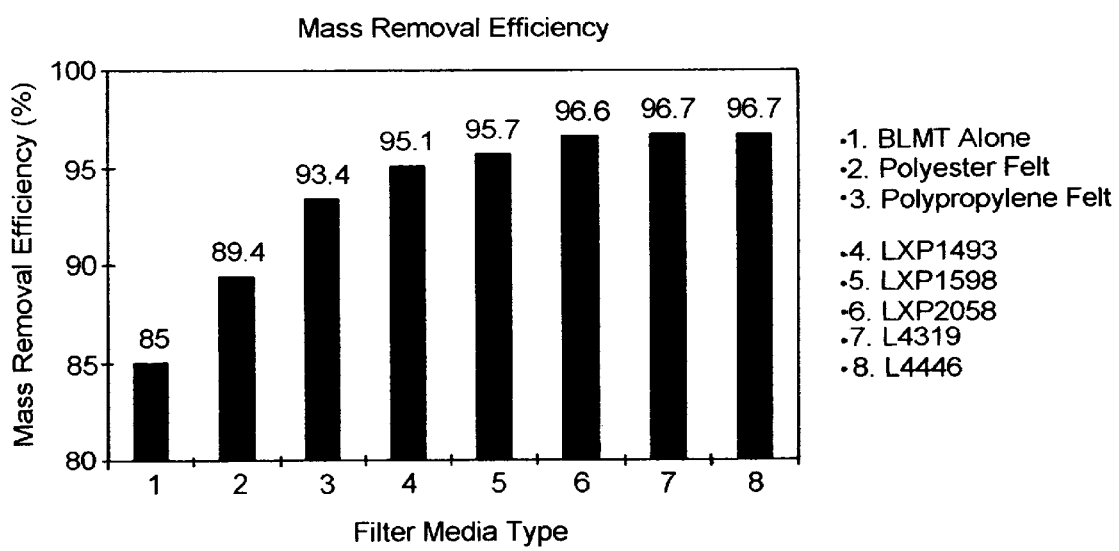
FIG. 17 is a chart showing the mass removal efficiency of different types of laminated and non-laminated filtration media.

FIG. 17 shows the initial mass removal efficiency of filtration devices similar to sample X, except that non-pleated cylindrical filtration media were used. The mass removal efficiency was calculated as the mass proportion of particulates that were prevented from passing through the filtration device when the device was rotated at 3450 rpm with a 200 cfm airflow. As shown in FIG. 17, the initial filtration performance of ePTFE laminates of the present invention to be substantially superior to non-laminated polypropylene and polyester felts.

We claim:

1. A method of filtering gases comprising:
providing a radial inflow centrifugal filtration device, the device comprising a bulkhead abutting a chamber and having a filtered fluid outlet, and
a filter element within the chamber rotatably coupled at the filtered fluid outlet to the bulkhead by a seal, wherein the filter element comprises filter media which includes a microporous expanded polytetrafluoroethylene membrane;
flowing a particle-laden gas from the chamber through said filter media and out of said filtered fluid outlet;
collecting particles from the particle-laden gas on the filter media; and
rotating said filter element at sufficient speed to eject particles from the filter media.

2. The method of claim 1, wherein the membrane is laminated to a backing material.

3. The method of clam 2, wherein the filter backing material comprises a polyester, conductive polyester, polypropylene, polyaramid, fiberglass, or polytetrafluoroethylene backing material, and combinations thereof.

4. The method of claim 2, wherein the backing material comprises a spunbond polyethylene, a bi-component spunbond polyethylene, or a polyethylene felt backing material, and combinations thereof.

5. The method of claim 1, wherein the particle-laden gas is an aerosol comprising polytetrafluoroethylene-wetting liquids.

6. The method of claim 1, wherein the particle-laden gas is an aerosol comprising polytetrafluoroethylene-non-wetting liquids.

7. The method of claim 1, wherein the particle-laden gas is an aerosol compromising at least one of liquid and solid matter.

8. The method of claim 1, wherein the filter media has a Mullen burst strength of at least about 25 psi and a Frazier number of at least about 0.5.

9. The method of claim 1, wherein the filter media has a Mullen burst strength of at least about 100 psi and a Frazier number of at least about 3.

10. The method of claim 1, wherein the seal is a contact seal.

11. The method of claim 1, wherein the seal is a non-contact seal.

12. The method of claim 1, wherein the expanded polytetrafluoroethylene membrane includes at least one filler.

13. The method of claim 12, wherein the filler includes metal, semi-metal, metal oxide, glass, or ceramic powders and combinations thereof.

14. The method of claim 12, wherein the filler includes activated carbon, carbon black, and polymeric resin powders and combinations thereof.

15. The method of claim 1, wherein the filter element is rotatably coupled to a second bulkhead, and is located between said bulkheads.

16. A method of filtering fluids comprising:
providing a radial inflow centrifugal filtration device, the device comprising a bulkhead abutting a chamber and having a filtered fluid outlet,
a filter element within the chamber rotatably coupled at the filtered fluid outlet to the bulkhead by a seal, wherein the filter element comprises filter media, and
a boundary layer momentum transfer device comprising a plurality of stacked annular disks having central openings, each disk separated from adjacent disks by a desired gap, wherein the central openings define a cavity in which the filter element is mounted;
flowing a particle-laden fluid from the chamber, between the stacked annular disks, through the filter media, and out of said filtered fluid outlet; and collecting particles from the particle-laden fluid on the filter media; and rotating said filter element and the boundary layer momentum transfer device at sufficient speed to eject particles in the particle-laden fluid from the filter media and the boundary layer momentum transfer device.

17. The method of claim 16, wherein the filter media comprises a polyester, polypropylene, polyaramid, fiberglass, polytetrafluoroethylene, polyethylene 1, or combinations thereof.

18. The method of claim 17, wherein the filter media comprises polyethylene in the form of a spunbond polyethylene, a bi-component polyethylene, a polyethylene felt, or combinations thereof.

19. The method of claim 16, wherein the particle-laden fluid is an aerosol comprising filter media wetting liquids.

20. The method of claim 16, wherein the particle-laden fluid is an aerosol comprising filter media non-wetting liquids.

21. The method of claim 16, wherein the particle-laden fluid is an aerosol compromising liquid and/or solid matter.

22. The method of claim 16, wherein the particle-laden fluid is a liquid containing suspended solid matter.

23. The method of claim 16, wherein the filter media comprises a polyester, conductive polyester, polypropylene, polyaramid, fiberglass, or polytetrafluoroethylene backingmaterial, and combinations thereof, laminated to a microporous membrane.

24. The method of claim 23, wherein the microporous membrane is an expanded polytetrafluoroethylene membrane.

25. The method of claim 24, wherein the expanded polytetrafluoroethylene membrane includes at least one filler.

26. The method of claim 25, wherein the filler includes metal, semi-metal, metal oxide, glass, or ceramic powders and combinations thereof.

27. The method of claim 26, wherein the filler includes activated carbon, carbon black, and polymeric resin powders and combinations thereof.

28. The method of claim 16, wherein the filter media comprise a spunbond polyethylene, a bi-component spunbond polyethylene, or a polyethylene felt backingmaterial, and combinations thereof, laminated to a microporous membrane.

29. The method of claim 28, wherein the microporous membrane is an expanded polytetrafluoroethylene membrane.

30. The method of claim 29, wherein the expanded polytetrafluoroethylene membrane includes at least one filler.

31. The method of claim 30, wherein the filler includes metal, semi-metal, metal oxide, glass, or ceramic powders and combinations thereof.

32. The method of claim 30, wherein the filler includes activated carbon, carbon black, and polymeric resin powders and combinations thereof.

33. The method of claim 16, wherein the filter media has a Mullen burst strength of at least about 25 psi and a Frazier number of at least about 0.5.

34. The method of claim 16, wherein the filter media has a Mullen burst strength of more than about 100 psi and a Frazier number of more than about 3.

35. The method of claim 16, wherein the seal is a contact seal.

36. The method of claim 16, wherein the seal is a non-contact seal.

37. The method of claim 16, wherein the filter element is rotatably coupled to a second bulkhead, and is located between said bulkheads.

38. A radial inflow centrifugal filtration device comprising:

a bulkhead abutting a chamber and having a filtered fluid outlet; and a filter element within the chamber rotatably coupled at the filtered fluid outlet to the bulkhead by a seal, wherein the filter element comprises a microporous expanded polytetrafluoroethylene membrane, and wherein the radial inflow centrifugal filtration device is adapted to separate particles from a particle-laden gas flowing radially into the filter element and to centrifugally eject particles from the membrane.

39. The device of claim 38, wherein the membrane is laminated to a backing material.

40. The device of claim 39, wherein the backing material comprises a polyester, polypropylene, polyaramid, fiberglass, polytetrafluoroethylene or polyethylene material, and combinations thereof.

41. The device of claim 40, wherein the backing material comprises polyethylene in the form of a spunbond polyethylene, a bi-component spunbond polyethylene, or a polyethylene felt material, and combinations thereof.

42. The device of claim 39, wherein the membrane laminated to the backing material has a Mullen burst strength of at least about 25 psi and a Frazier number of at least about 0.5.

43. The device of claim 39, wherein the membrane laminated to the backing material has a Mullen burst strength of at least about 100 psi and a Frazier number of at least about 3.

44. The device of claim 38, wherein the seal is a contact seal.

45. The device of claim 38, wherein the seal is a non-contact seal.

46. The device of claim 38, wherein the expanded polytetrafluoroethylene membrane includes at least one filler.

47. The device of claim 46, wherein the filler includes metal, semi-metal, metal oxide, glass, or ceramic powders and combinations thereof.

48. The device of claim 46, wherein the filler includes activated carbon, carbon black, and polymeric resin powders and combinations thereof.

49. The device of claim 38, wherein the filter element is further rotatably coupled to a second bulkhead, and is located between said bulkheads.

50. A radial inflow centrifugal filtration device comprising:

a bulkhead abutting a chamber and having a filtered fluid outlet;

a filter element within the chamber, wherein the filter element includes filter media and is rotatably coupled at the filtered fluid outlet to the bulkhead by a seal; and a boundary layer momentum transfer device comprising a plurality of stacked annular disks having central openings, each disk separated from adjacent disks by a desired gap, wherein the central openings define a cavity in which the filter element is mounted, and wherein the radial inflow centrifugal filtration device is adapted to separate particles from a particle-laden fluid flowing radially into the filtration device and to centrifugally eject particles from the filter media.

51. The device of claim 50, wherein the filter media comprises a polyester, polypropylene, polyiramid, fiberglass, polytetrafluoroethylene, polyethylene, or combinations thereof.

52. The device of claim 51, wherein the filter media comprises polyethylene in the form of a spunbond polyethylene, a bi-component polyethylene, a polyethylene felt, or combinations thereof.

53. The device of claim 50, wherein the filter media comprises a microporous membrane laminated to a backing material.

54. The device of claim 53, wherein the microporous membrane is an expanded polytetrafluoroethylene membrane.

55. The device of claim 54, wherein the expanded polytetrafluoroethylene membrane includes at least one filler.

56. The device of claim 55, wherein the filler includes metal, semi-metal, metal oxide, glass, or ceramic powders and combinations thereof.

57. The device of claim 55, wherein the filler includes activated carbon, carbon black, and polymeric resin powders and combinations thereof.

58. The device of claim 53, wherein the filter media comprises polyethylene in the form of a spunbond polyethylene, a bi-component spunbond polyethylene, or a polyethylene felt backing material, and combinations thereof, laminated to said microporous membrane.

59. The device of claim 50, wherein the filter media comprises a polyester, polypropylene, polyaramid, fiberglass, polytetrafluoroethylene or polyethylene backing material, and combinations thereof, laminated to a fluorinated polymer microporous membrane.

60. The device of claim 50, wherein the filter media has a Mullen burst strength of at least about 25 psi and a Frazier number of at least about 0.5.

61. The device of claim 50, wherein the filter media has a Mullen burst strength of at least about 100 psi and a Frazier number of at least about 3.

62. The device of claim 50, wherein the seal is a contact seal.

63. The device of claim 50, wherein the seal is a non-contact seal.

64. The device of claim 50, wherein the filter element is rotatably coupled to a second bulkhead, and is located between said bulkheads.

\* \* \* \* \*